US008233568B2

(12) United States Patent
Kumar et al.

(10) Patent No.: US 8,233,568 B2
(45) Date of Patent: Jul. 31, 2012

(54) ADAPTIVE RECEIVER FOR HIGH-ORDER MODULATED SIGNALS OVER FADING CHANNELS

(75) Inventors: Rajendra Kumar, Cerritos, CA (US); Ramses Diaz de Leon, Rancho Santa Margarita, CA (US)

(73) Assignee: Rajendra Kumar, Cerritos, CA (US)

( * ) Notice: Subject to any disclaimer, the term of this patent is extended or adjusted under 35 U.S.C. 154(b) by 999 days.

(21) Appl. No.: 12/205,448

(22) Filed: Sep. 5, 2008

(65) Prior Publication Data

US 2010/0061487 A1    Mar. 11, 2010

(51) Int. Cl.
    *H04L 27/00* (2006.01)
(52) U.S. Cl. ...................................... 375/324
(58) Field of Classification Search ................... 375/324, 375/237–239, 259, 261, 279, 295, 308, 316, 375/322, 329, 346, 353; 348/725; 455/67.11, 455/306; 701/213; 216/67; 369/44.11; 360/75; 370/330
See application file for complete search history.

(56) References Cited

U.S. PATENT DOCUMENTS

| 4,985,900 | A  | * | 1/1991  | Rhind et al.     | 375/226   |
| 5,933,200 | A  | * | 8/1999  | Han              | 348/725   |
| 7,450,924 | B1 | * | 11/2008 | Mostafa et al.   | 455/306   |
| 2006/0094365 | A1 | * | 5/2006 | Inogai et al.    | 455/67.11 |
| 2009/0059741 | A1 | * | 3/2009 | Ishimoto         | 369/44.11 |
| 2009/0219646 | A1 | * | 9/2009 | Ishihara et al.  | 360/75    |
| 2009/0242513 | A1 | * | 10/2009 | Funk et al.     | 216/67    |
| 2009/0254276 | A1 | * | 10/2009 | Faulkner et al. | 701/213   |

* cited by examiner

*Primary Examiner* — Chieh M Fan
*Assistant Examiner* — Shawkat M Ali
(74) *Attorney, Agent, or Firm* — Fulwider Patton LLP

(57) ABSTRACT

An adaptive receiver to provide reliable estimates of the symbols for the high-order MQAM and MPSK modulated signals received in the presence of amplitude fading and phase dynamics induced due to time-varying atmospheric or terrestrial multipath fading encountered in wireless communication channels. The adaptive receiver encompasses an adaptive tracking loop comprised of adaptive channel fade envelope estimator derived from the high-order modulated signal, a novel phase detector to separately estimate the phase due to the fading channel and the reference oscillator from that due to the data modulation present in the received signal without the need of any pilot symbol or pilot carrier, and a Kalman filter, a fixed-lag smoother and a smoothed symbol detector.

22 Claims, 11 Drawing Sheets

ADAPTIVE RECEIVER FOR HIGH-ORDER MODULATED SIGNALS OVER FADING CHANNELS

BACKGROUND

The present invention relates to an adaptive receiver that acquires and tracks the carrier frequency and phase of QAM and MPSK signals under fading channel conditions, and provides reliable data estimates under such fading conditions encountered in wireless communication. The adaptive receiver utilizes an adaptive filter, a phase detector, a Kalman filter, a fixed lag smoother, and a smoothed symbol detector to provide an accurate estimate of the channel fade envelope, to compensate for the phase dynamics induced due to time-varying atmospheric or terrestrial multipath fading, and to provide reliable estimates of the symbols of high-order modulated signals.

Wireless communication systems are currently in a rapid evolutionary phase in terms of development of various technologies, development of various applications, deployment of various services, and generation of many important standards in the field. Although there are many factors to be considered in the design of these systems, important factors include the bandwidth utilization efficiency due to the limited bandwidth allocation, flexibility in operation and robustness of the communication link in the presence of various disturbances such as fading while achieving the specified performance.

The bandwidth and power efficient communication systems require coherent multilevel modulation techniques such as MQAM with M equal to 16 or higher, and MPSK signals. While both MQAM and MPSK signals have the same bandwidth efficiency for any value of M, the MQAM signals have a much higher power efficiency compared to MPSK. However, the detection of MQAM signals for M higher than 4 requires an accurate knowledge of the signal amplitude which is relatively difficult to obtain under time-varying random variations in the channel gain as occurs, for example, in Rayleigh fading channels in wireless communication. In the absence of a technique for a fast and accurate tracking of the fade envelope of the channel, the application of the MQAM techniques for M greater than 4 has serious limitations in terms of their applications to wireless channels.

Additionally, both MQAM and MPSK techniques require an accurate estimation of the carrier frequency and phase which are corrupted by the phase noise introduced by the fading channel, in addition to any oscillator noise that is present in non fading channels. However, the magnitude of the phase noise due to the channel is much higher compared to that due to the oscillator. The required accuracy of the carrier phase increases with order M for both the MQAM and MPSK signals. Thus, successful applications of high order QAM techniques to wireless fading communication channels require both an accurate carrier phase acquisition and tracking, and a fast and accurate tracking of the channel fade envelope.

In order to achieve high power efficiency, the carrier reference is obtained by some processing of the data modulated signal itself rather than transmitting a pilot carrier signal which results in power loss. Among such techniques is the loop involving a fourth power circuit followed by a narrow band phase lock loop that tracks four times the carrier frequency. This is suitable for QPSK modulation, which is the same as MQAM or MPSK with M equal to 4. See "Using Times-Four Carrier Recovery in M-QAM Digital Radio Receivers," by A. J. Rustako, et. al., IEEE Journal on Selected Areas in Communications, vol. SAC-5, No. 3, pp. 524-533, April 1987. In a fading environment, a limiter precedes the fourth power circuit to eliminate the gain variations in the loop. See "A Limiter Aided 4th Multiplying PLL Carrier Recovery Technique for 16-QAM Signal," IEEE, 1997. However, the process of limiting amplifies the noise. Also, the method is vulnerable to phase jitter induced by random data patterns. Such techniques involving limiting and taking power M of the signal are also applicable to higher order MPSK signals, albeit with the same disadvantages and do not extend to MQAM with M>4. Decision-directed methods known as polarity-type Costas loop for the MPSK signals involve slicing the inphase and quadrature components of the received signal. See," A Generalized Polarity-Type Costas Loop for Tracking MPSK Signals," IEEE Transactions on Communications, Vol. 30, N0. 10, pp. 2289-2296, October 1982. This requires the knowledge of the signal amplitude and thus does not apply to MQAM signals with M>4 under fading conditions. In the absence of accurate channel gain estimate in the fading environment, the application of the decision-directed methods to MQAM is not feasible and results in significant degradation in performance in the data estimates along with frequent loss of lock and long acquisition times. An earlier proposed solution to this problem by Dobrica, Carrier Synchronization Unit, U.S. Pat. No. 5,875,215, Feb. 23, 1999, used pilot symbols to estimate the channel gain. However, the use of pilot symbols result in significant reduction in capacity of the channel and requires interpolation of the amplitude and phase estimates from the pilot symbols to the subsequent data symbols. This leads to significant errors in amplitude and phase estimates during the data symbol detection, and imposes logistic difficulties in terms of maintaining the pilot symbol sequences, the need for frame synchronization, etc. Kumar, U.S. Pat. No. 6,693,979, Feb. 17, 2004 teaches a receiver for improved phase estimation using fixed-lag smoothing by estimating the fading channel amplitude. However, in the earlier teaching of Kumar there is no data modulation considered and thus does not solve the problem of reliable detection of high-order modulated signal over fading channels without the need for any pilot signals. These and other disadvantages are solved or reduced by the receiver of the present invention.

SUMMARY OF THE INVENTION

The adaptive receiver architecture of this invention acquires and accurately tracks the carrier frequency and phase of a high-order MQAM modulation even in the presence of severe Rayleigh fading distortion without incurring any significant penalty compared to the case of known carrier amplitude and phase. The adaptive receiver also provides an accurate filtered estimate of the instantaneous channel fade envelope. The receiver of the present invention preferably employs an adaptive filter to estimate the channel fade envelope along with a phase detector, a Kalman filter, a fixed lag smoother, and a smoothed symbol detector to accurately track the carrier frequency and phase and provide reliable estimates of the symbols for high-order MQAM and MPSK modulated signals received in the presence of amplitude and phase dynamics induced due to time-varying atmospheric or terrestrial multipath fading.

An object of this invention is to provide reliable estimates of the symbols for the high-order MQAM and MPSK modulated signals received in the presence of amplitude and phase dynamics induced due to time-varying atmospheric or terrestrial multipath fading.

Another object of the invention is to provide real-time and accurate estimation of the channel fade envelope derived from the high-order MQAM and MPSK modulated signals.

Another object of the invention is to provide an adaptive smoother to provide improved carrier phase estimation in the presence of amplitude and phase dynamics of the fading channel.

Another object of the invention is to provide a phase detector to provide the prediction error to the Kalman filter and the inphase and quadrature components of the detected symbol.

Yet another object of the invention is to provide a phase detector for more general modulation formats, including the MQAM and MPSK modulation.

Yet another object of the invention is to provide improved estimates of the symbols of high-order MQAM and MPSK modulated signals by using the improved carrier phase provided by the adaptive smoother.

Still another object of the invention is to provide a phase detector to provide an estimate of the carrier phase on the basis of the signals provided by an adaptive signal processor, the adaptive signal processor for a real-time estimation of the fade envelope, and to provide non fading normalized sampled baseband signals to the phase detector, a Kalman filter based phase locked loop for carrier phase estimation, to provide sampled baseband signals to the adaptive signal processor, and in combination with a fixed lag smoother and a smoothed symbol detector to provide improved phase estimates and improved data symbol estimation.

The present invention is an adaptive receiver for solving the problems of degradation in the performance of a receiver for high order MQAM and MPSK signals in the presence channel fading conditions in wireless communication. The detection of MQAM signals for M higher than 4 requires an accurate knowledge of the signal amplitude, which is relatively difficult to obtain under time-varying random variations in the channel gain as occurs, for example, in Rayleigh fading channels. In the absence of a technique for a fast and accurate tracking of the fade envelope of the channel, the application of the MQAM techniques for M greater than 4 has serious limitations in terms of their applications to wireless channels. Additionally, both MQAM and MPSK techniques require an accurate estimation of the carrier frequency and phase, which is corrupted by the phase noise introduced by the fading channel in addition to any oscillator noise which is present in non fading channels. In the absence of an accurate channel gain estimate in the fading environment, the application of the decision-directed methods to MQAM results in significant degradation in performance in the data estimates along with frequent loss of lock and long acquisition times. This invention solves these and other problems by providing an adaptive signal processor that accurately estimates the channel fade envelope in real-time from the high-order MQAM or MPSK modulated signals. The adaptive receiver provides a phase detector to derive a prediction error from the non fading normalized sampled baseband signals provided by the adaptive signal processor.

In the adaptive receiver of the invention for the high-order MQAM or MPSK modulated signals, the received RF signal after down conversion to an intermediate frequency (IF) signal is the input to a complex mixer along with the numerically controlled oscillator (NCO) output. The NCO output contains a sine and cosine carrier waveforms at IF frequency with the NCO phase determined by the phase tracking loop. The complex mixer outputs after being filtered by square-root raised cosine filters are digitized by analog-to-digital converters (ADC). The outputs of the ADCs provide the sampled baseband signals to the adaptive signal processor.

The complex mixer, the ADCs, square-root raised cosine filters, adaptive signal processor, phase detector, Kalman filter and an NCO (numerically controlled oscillator) comprise a phase tracking loop that is made adaptive with the adaptive fade envelope filter that is part of the adaptive signal processor. The tracking loop provides an adaptive filtered estimate of the phase noise dynamics induced both due to the fading channel and the phase noise of the NCO, and adjusts the NCO instantaneous frequency such that the NCO phase is equal to the filtered phase estimate. In a preferred embodiment of the invention, the tracking loop phase detector, using a pair of threshold circuits and simple trigonometric identities, segregates the phase component due to channel induced phase and the oscillator phase noise from the phase of the data symbol thus providing a robust adaptive carrier phase tracking. Thus, the tracking loop adaptively provides an accurate estimate of the phase induced by the channel and the oscillator phase noise, and adjusts the NCO phase in such a manner that there is only a small degradation in the data symbol detection due to any phase tracking error even in the presence of channel fading. In addition, the adaptive tracking loop phase detector also provides the detected inphase and quadrature components of the data symbols based on the filtered phase and the fade envelope estimates.

The phase estimate provided by the Kalman filter based adaptive tracking loop is optimum when no delay is included in the estimate. However reduction in any residual phase error due to the adaptive tracking loop is further reduced by a fixed-lag smoother providing a better estimate of the carrier phase with a delay of a few symbols. The normalized sampled baseband signals at the output of the adaptive signal processor are input to the smoothed symbol detector which, on the basis of phase corrections provided by the fixed-lag smoother, provides smoothed detected symbol output such that the probability of symbol error with the use of smoothed detected symbol output is smaller than the probability of symbol error using the detected symbol output provided by the phase detector of the adaptive phase tracking loop. The fixed-lag smoother and smoothed symbol detector achieve improved phase estimation and symbol detection by introducing a fixed delay in the estimation and detection process. This delay is similar to the delay introduced by the physical propagation channel and is only a very small fraction thereof, and thus does not adversely affect the performance of the adaptive receiver in any way. Thus the combination of the Kalman filter based adaptive phase tracking loop, the fixed lag smoother, and smoother symbol detector provide better performance than the adaptive tracking loop alone. Furthermore the adaptive tracking loop solves the difficulty of detection of high-order digitally modulated signals received over fading channels wherein the traditional non adaptive receivers will have relatively poor performance. The most significant benefits of a method of this invention are accurate and fast carrier phase and frequency acquisition and tracking, better probability of symbol error, and operational reliability over diverse communication channels including the fading channels encompassing both amplitude fading and severe phase noise distortion as are encountered in wireless communication. These and other advantages will become more apparent from the following detailed description of the preferred embodiment.

BRIEF DESCRIPTION OF THE DRAWINGS

In the succeeding section, the invention will be described in detail with reference made to the accompanying drawings, in which.

DETAILED DESCRIPTION OF THE PREFERRED EMBODIMENTS

Figure 1:
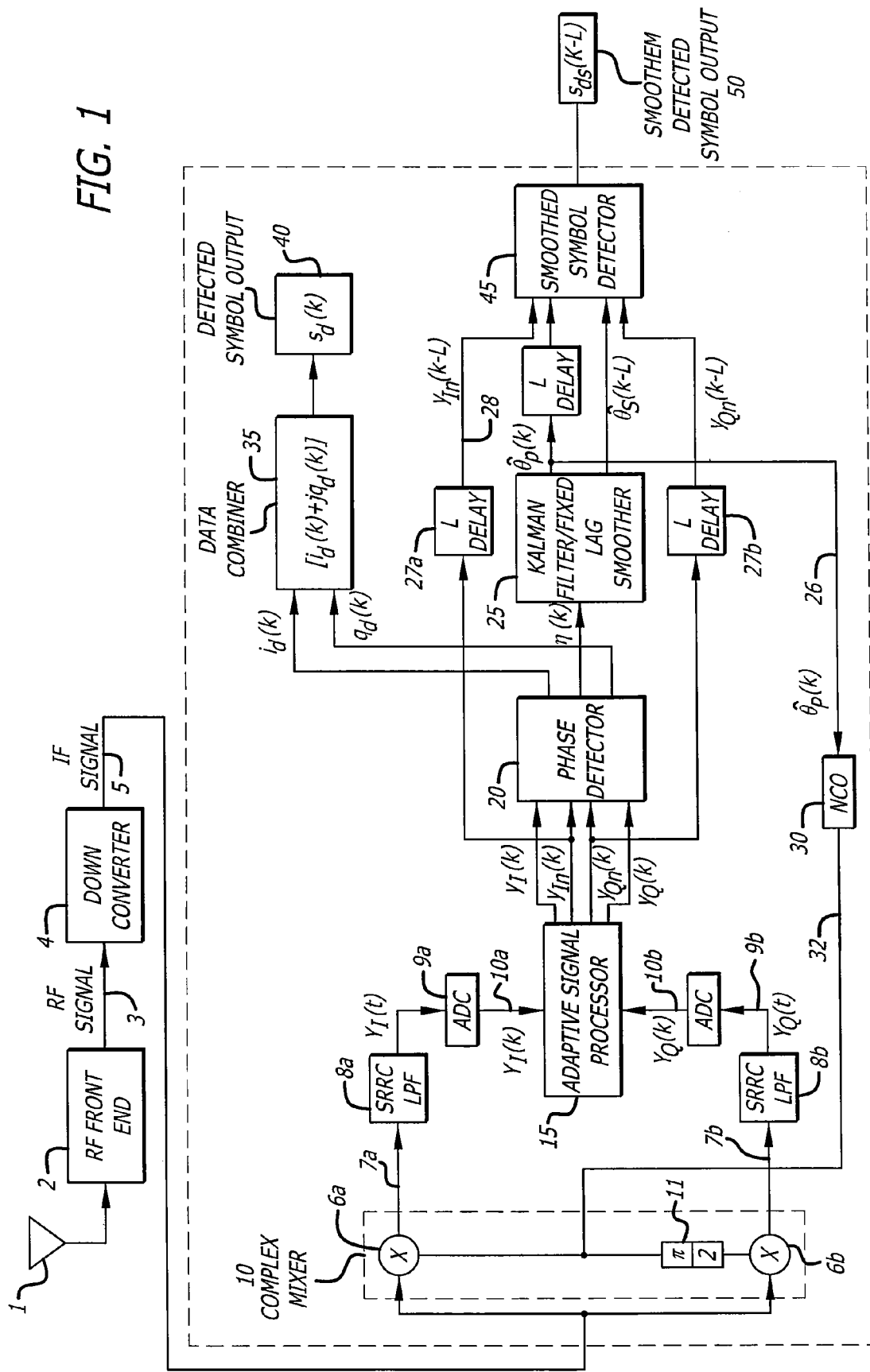
FIG. 1 is a block diagram for a first preferred embodiment of the present invention.

An embodiment of the present invention as depicted in FIG. 1 is disclosed and explained in detail with the aid of reference designators in the former drawing. More particularly, the present invention concerns a novel adaptive receiver architecture and carrier recovery loop propounded for, inter alia, M-QAM modulated signals. The algorithm performs an intermediate estimate of the amplitude envelope for normalization. The cosine and sine of the phase modulation term are further reckoned and removed through simple trigonometric identities, rendering the phase error estimate applied to the loop filter input. This technique offers several advantages over conventional carrier recovery structures, such as low cost, robustness and low complexity without infusing phase jitter due to random data patterns nor long acquisition times.

An embodiment of the invention is described with reference to the drawings using reference numbers shown in the drawings. The adaptive receiver of this invention is preferably used in a communication system that uses high-order digital modulation techniques operating over fading communication channels. Referring to the drawing of the adaptive receiver shown in FIG. 1, the antenna 1 receives high-order modulated communication signal which is filtered and amplified by the RF front end 2. The amplified and filtered RF signal 3 is downconverted to an intermediate frequency (IF) by a down converter 4.

The resulting IF signal 5 denoted by r(t) is input to the complex mixer 10 and may be expressed in the AM-PM form shown below $$r(t)=\alpha(t)A_0 A_{df}(t)\cos[2\pi f_{IF}t+\phi_{df}(t)+\theta_i(t)]+n(t) \quad (1)$$

where $f_{IF}$ denotes the intermediate frequency, $A_0$ is a constant that includes the mean channel gain, $\alpha(t)$ is the fading envelope, $A_{df}(t)$ and $\phi_{df}(t)$ denote respectively the filtered data amplitude and phase modulation waveforms, $\theta_i(t)$ is the carrier phase induced by the fading channel, and n(t) denotes the receiver additive noise with two-sided power spectral density equal to $N_0/2$. The amplitude and phase modulation terms $A_{df}(t)$ and $\phi_{df}(t)$ may equivalently be also expressed in terms of the normalized inphase and quadrature modulation terms $x_{If}(t)$ and $x_{Qf}(t)$ by (2) below $$A_{df}(t) = \sqrt{x_{If}^2(t) + x_{Qf}^2(t)} \quad (2a)$$

$$\phi_{df}(t) = \tan^{-1}\left[\frac{x_{Qf}(t)}{x_{If}(t)}\right] \quad (2b)$$

Or equivalently in term of the complex baseband envelope g(t) given by $$g(t)=x_{If}(t)+jx_{Qf}(t); j=\sqrt{-1} \quad (2c)$$

In most cases in practice the filtered inphase and quadrature modulation terms $x_{If}(t)$ and $x_{Qf}(t)$ are obtained by filtering the corresponding unfiltered signals $x_f(t)$ and $y_f(t)$ by square-root raised cosine filters. However, in some applications, there may be no such band-limiting filtering involved. The receiver architecture described herein applies to all such cases. Over the $k^{th}$ modulation symbol period of duration $T_s$, the unfiltered signals $x_f(t)$ and $y_f(t)$ are constant equal to the real and imaginary parts of the $k^{th}$ modulation symbol s(k) and denoted by i(k) and q(k) respectively for all integers k≧0.

The inphase and quadrature modulation terms $x_f(t)$ and $x_Q(t)$ take values over a fixed set of values independent of the channel gain $A_0$ and the fading envelope $\alpha(t)$. For example, for the case of QPSK modulation both are equal to ±1. The fading envelope is assumed to have its second moment equal to 1, i.e., $E[\alpha^2(t)]=1$ where E denotes the expected value operator. This is in view of the fact that the mean channel gain is absorbed in the factor $A_0$. For the special case of non-fading additive white Gaussian noise (AWGN) channels $\alpha(t)$≡1.

The additive white Gaussian noise n(t) in (1) can similarly be expressed in terms of I-Q representation as $$n(t)=v_I(t)\cos(2\pi f_{IF}t+\theta(t))-v_Q(t)\sin(2\pi f_{IF}t+\theta(t)) \quad (3)$$

where the inphase and quadrature noise terms $v_I(t)$ and $v_Q(t)$ are statistically independent Gaussian processes each with two-sided power spectral density ratio equal to $N_0$.

Referring to FIG. 1 the IF signal 5 is input to a complex mixer 10. The complex mixer comprises of a pair of real mixers 6a, 6b and a π/2 phase shift circuit 11. The first input to the complex mixer is the IF signal r(t). The other input to the complex mixer is the $v_{LO}$ signal provided by the NCO (numerically controlled oscillator) 30 given by $$v_{LO}(t)=2\cos[2\pi f_{IF}t+\theta_{LO}(t)]=2\cos[2\pi f_{IF}t+\theta_{pn}(t)+\hat{\theta}_P(t)] \quad (4)$$

In Eqn. (4), the NCO phase $\theta_{LO}(t)$ is the sum of the oscillator phase noise $\theta_{pn}(t)$ and the phase $\hat{\theta}_P(t)$ due to the signal 26 at the NCO input obtained from the Filter/Fixed Lag Smoother 25. The $2f_{IF}$ frequency terms generated in the complex mixers 6a, 6b are filtered out by the following low pass filters and are therefore ignored. The mixer outputs are filtered by the square-root raised cosine (SRRC) filters 8a, 8b which are the matched filters for the case when the data modulation involves band limiting by SRRC filtering. For the case of no band-limiting, the SRRC filter is replaced by an integrate and dump (I&D) filter. The outputs of both the matched filters, which may be either SRRC or I&D filters depending upon whether the modulated data is band limited or not band limited respectively, are sampled by the ADC (analog-to-digital converters) 9a and 9b with the sampling rate selected equal to the modulation symbol rate. The sampled signals 10a and 10b at the outputs of ADCs 9a and 9b and denoted by $Y_I(k)$ and $Y_Q(t)$ are input to the adaptive signal processing block 15. The sampled matched filtered baseband signals may be expressed in terms of various parameters of interest by (5) and (6) below $$Y_I(k) = \alpha(k) A_0 A_d(k) \cos[\phi_d(k) + \tilde{\theta}(k)] + v_i(k) \cos[\tilde{\theta}(k)] \quad (5)$$

$$Y_Q(k) = \alpha(k) A_0 A_d(k) \cos[\phi_d(k) + \tilde{\theta}(k)] + v_q(k) \cos[\tilde{\theta}(k)] \quad (6)$$

In equations (5) and (6), k denotes the sample time index and $\tilde{\theta}(k) = \theta(k) - \hat{\theta}_P(k)$ denotes the phase tracking error with $\theta(k) = \theta_i(k) - \theta_{pn}(k)$. In an alternative embodiment of the invention with an all digital implementation, the IF signal r(t) is sampled and converted into digital form and the NCO 30 is replaced by a digital oscillator, such that all the operations including those of the complex mixer and SRRC can be performed in digital domain.

Figure 2:
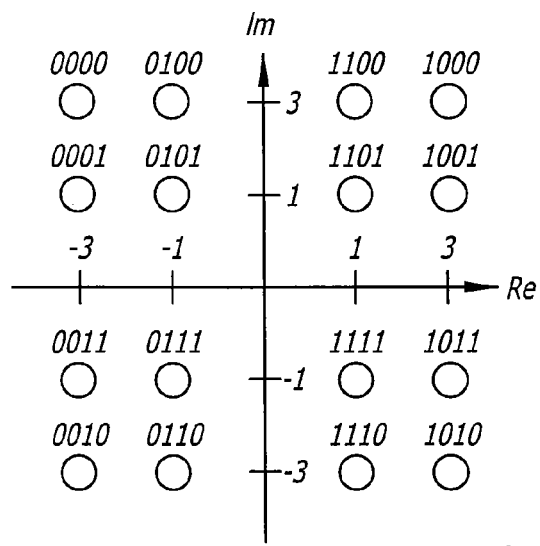
FIG. 2 is a graph depicting the normalized signal constellation of a MQAM signal for M=16.

For the M-QAM modulation signal in the absence of fading, the ideal signal constellation coordinates of the signal points are given by $\{\pm(2k+1)A_o, \pm(2k+1)A_o\}$ for $k=0, 1, \ldots, ((K/2)-1)$ with $K=\sqrt{M}$ where $A_0$ denotes the unknown channel gain. In this case the signal constellation is primarily a function of the parameter $A_0$. The normalized signal constellation is one for which $A_0 = 1$. FIG. 2 depicts the normalized signal constellation for the example 16-QAM signal. As part of the phase estimation procedure, the adaptive signal processor 15 detailed in FIG. 3 estimates the channel gain parameter from the sampled matched filtered baseband signals $Y_I(k)$ and $Y_Q(k)$ or from the sampled complex baseband signal $Y(k) = Y_I(k) + \sqrt{-1} Y_Q(k)$ by the $\hat{A}_0$ estimate block 111.

The average power of the sampled complex signal $Y(k)$ is related to the parameter $A_0$ by equations (7a) and (7b).

$$A_{\text{rms}}^2(k) = \frac{1}{4}[4(\beta A_0^2(k))] = \beta A_0^2(k) \quad (7a)$$

$$\beta = \frac{4}{K} \sum_{k=0}^{\frac{K}{2}-1} (2k+1)^2 \quad (7b)$$

The $\hat{A}_0$ estimate block 111 first estimates the $A_{rms}$ from the sampled baseband signals $Y_I(k)$ and $Y_Q(k)$ by equation (8)

$$\hat{A}_{\text{rms}}(k) = \sqrt{\frac{1}{N} \sum_{n=k-N+1}^{k} [Y_I^2(k) + Y_Q^2(k)] - \frac{2N_0}{T_s}} \quad (8)$$

The estimate for $A_0$ is then obtained in the $\hat{A}_0$ estimate block 111 by equation (9)

$$\hat{A}_0 = \hat{A}_{rms}/\sqrt{\beta} \quad (9)$$

In Eqn. (8) the last term under the square root sign represents the $E[v_I^2(k) + v_Q^2(k)]$ with E denoting the expected value and the estimation window size N is selected such that the estimation error is relatively small when there is no fading. For the case of fading channels, $\hat{A}_{rms}^2$ from (8) is given by Eqn. (10)

$$\hat{A}_{\text{rms}}^2(k) = \beta A_0^2 \frac{1}{N} \sum_{n=k-N+1}^{k} \alpha^2(n) + \text{noise} \quad (10)$$

where the noise term in (10) denotes all terms that are dependent upon the additive noise terms $v_I(k)$ and $v_Q(k)$. For N sufficiently large, the noise term will become relatively small and the average over $\alpha^2(n)$ will approach $E[\alpha^2(n)]$ which is equal to 1. Thus the estimate $\hat{A}_{rms}$ will approach the value $A_0\sqrt{\beta}$ or $A_{rms}$ as desired. In an alternative embodiment of the invention the rectangular averaging window in (8) can be replaced by an exponentially data weighed window. For the case of fading channels, N is selected to be much higher compared to fading time constants to obtain the desired results.

Figure 3:
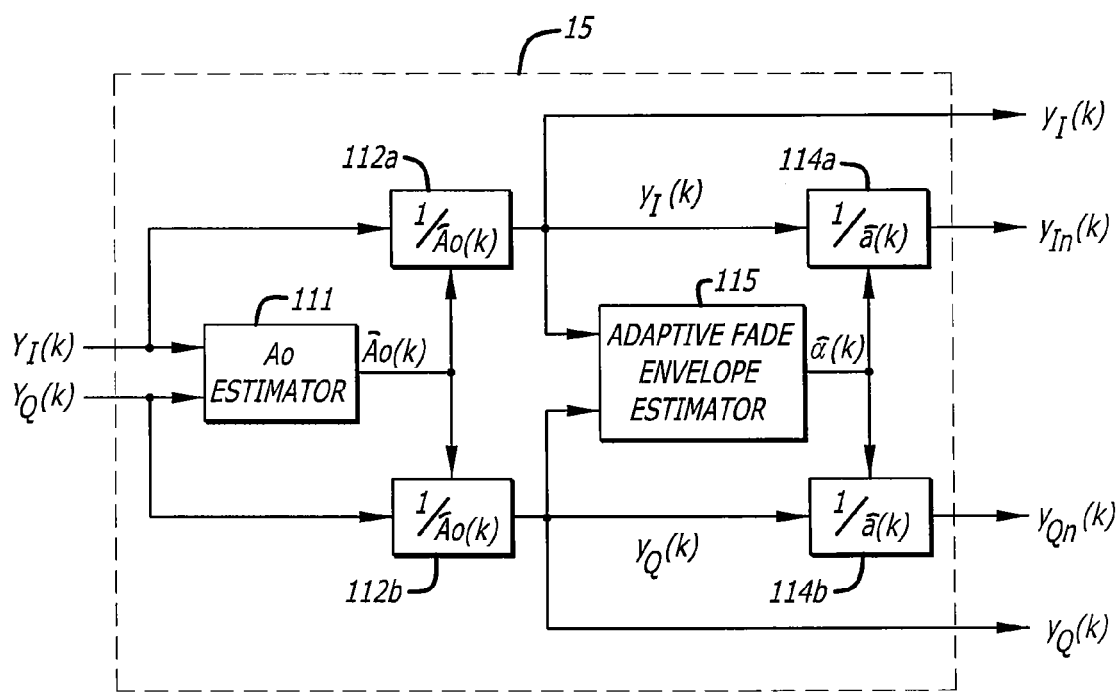
FIG. 3 is a block diagram of a preferred embodiment of the adaptive signal processor block of FIG. 1.

Referring to FIG. 3 the sampled baseband signals $Y_I(k)$ and $Y_Q(k)$ are input to the $1/\hat{A}_0(k)$ blocks 112a and 112b. The $1/\hat{A}_0$ blocks 112a and 112b blocks are also input with the output of the $\hat{A}_0(k)$ estimator block 111 and generate the normalized sampled baseband signals $y_I(k)$ and $y_Q(k)$ at their outputs. The normalized sampled baseband signals $y_I(k)$ and $y_Q(k)$ are given by Eqns. (11) and (12).

$$y_I(k) = \frac{Y_I(k)}{\hat{A}_0(k)} \quad (11)$$

$$y_Q(k) = \frac{Y_Q(k)}{\hat{A}_0(k)} \quad (12)$$

The normalized sampled baseband signals $y_I(k)$ and $y_Q(k)$ are related to various parameters such as the channel gain $A_0$, amplitude and phase modulation $A_d(k)$ and $\phi_d(k)$, and the phase error $\tilde{\theta}(k)$ by Eqns. (13) and (14).

$$y_I(k) = \alpha(k) \frac{A_0}{\hat{A}_0(k)} A_d(k) \cos[\phi_d(k) + \tilde{\theta}(k)] + \frac{v_I(k)\cos[\tilde{\theta}(k)]}{\hat{A}_0(k)} \quad (13)$$

$$y_Q(k) = \alpha(k) \frac{A_0}{\hat{A}_0(k)} A_d(k) \sin[\phi_d(k) + \tilde{\theta}(k)] + \frac{v_Q(k)\cos[\tilde{\theta}(k)]}{\hat{A}_0(k)} \quad (14)$$

If the phase estimation error $\tilde{\theta}(k)$ and the channel gain estimation error $\lfloor A_0 - \hat{A}_0(k) \rfloor$ both are relatively small, then both $y_I(k)$ and $y_Q(k)$ are respectively equal to $\alpha(k)$ times the inphase and quadrature modulation terms plus noise. The normalized sampled baseband signals $y_I(k)$ and $y_Q(k)$ are input to $1/\hat{\alpha}(k)$ blocks 114a and 114b. The normalized sampled baseband signals $y_I(k)$ and $y_Q(k)$ are also input to the adaptive fade envelope estimator 115. The adaptive fade envelope estimator 115 processes the normalized sampled baseband signals $y_I(k)$ and $y_Q(k)$ so as to obtain an instantaneous estimate $\hat{\alpha}(k)$ of the fade envelope $\alpha(k)$ at the output. The fade envelope estimate $\hat{\alpha}(k)$ is input to the $1/\hat{\alpha}(k)$ blocks 114a and 114b. The $1/\hat{\alpha}(k)$ blocks 114a and 114b normalize the normalized sampled baseband signals $y_I(k)$ and $y_Q(k)$ by the fade envelope estimate $\hat{\alpha}(k)$ to produce non fading normalized sampled baseband signals $y_{In}(k)$ and $y_{Qn}(k)$ at the output as per Eqns. (15) and (16):

$$y_{In}(k) = y_I(k)/\hat{\alpha}(k) \quad (15)$$

$$y_{Qn}(k) = y_Q(k)/\hat{\alpha}(k) \quad (16)$$

Figure 4:
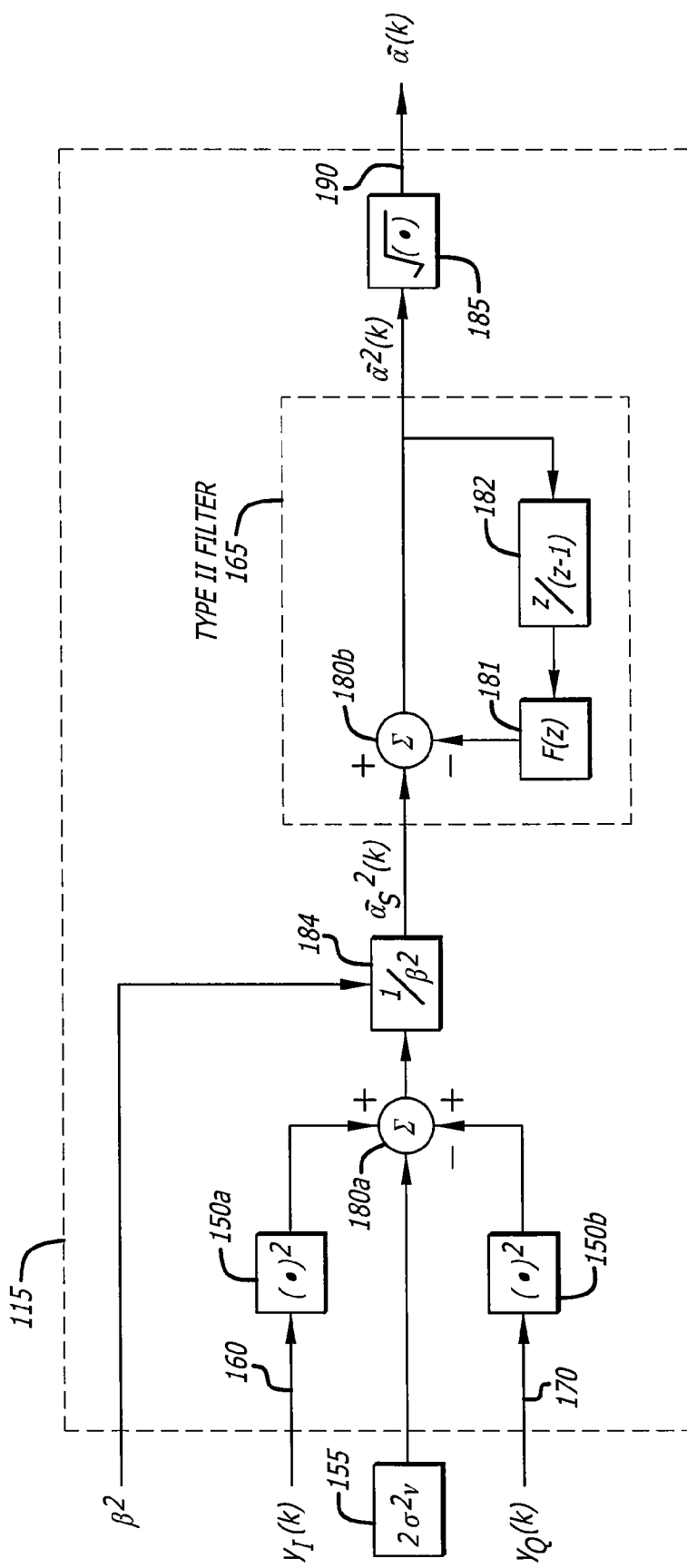
FIG. 4 is a block diagram of a preferred embodiment of the adaptive fade envelope estimator in connection with the adaptive signal processor block of FIG. 3.

Referring to FIG. 4, the adaptive fade envelope estimator 115 is input with the normalized sampled baseband signals $y_I(k)$ and $y_Q(k)$ and the parameter $2\sigma_v^2$ with $\sigma_v^2$ denoting the variance of $v_I(k)$ and $v_Q(k)$ normalized by $\hat{A}_0$. Inside the fade envelope estimator 115 a preliminary sample estimate $\hat{\alpha}_s^2(k)$ of the square of the fade envelope $\alpha^2(k)$ is obtained first by blocks 150a, 150b, 180a, and 184 according to Eqns. (17) and (18).

$$\hat{\alpha}_S^2(k) = \frac{1}{\beta^2}[y_I^2(k) + y_Q^2(k) - 2\sigma_v^2] \qquad (17)$$

$$\sigma_v^2 = \frac{\beta}{m}\left(\frac{2E_b}{N_0}\right)^{-1}; m = \log_2(M) \qquad (18)$$

where $(E_b/N_0)$ denotes the received bit energy to noise power spectral density ratio in the absence of fading and m is the number of bits per QAM symbol. The estimate given by Eqn. (17) is an asymptotically unbiased estimate of the square of the fade envelope $\alpha^2(k)$ in that with increasing time index k, the expected value of the estimate approaches $\alpha^2(k)$. However, it is effected by noise. The preliminary sample estimate $\hat{\alpha}_S^2(k)$ is input to the Type II filter 165 in the adaptive fade envelope estimator 115. The Type II filter 165 is comprised of an adder 180b, an accumulator 182 with transfer function [z/(z−1)] and a filter 181 with transfer function F(z). The output of the type II filter is the final estimate $\hat{\alpha}^2(k)$ of the square of the fade envelope $\alpha^2(k)$.

The final estimate $\hat{\alpha}^2(k)$ with reduced noise is related to the preliminary sample estimate $\hat{\alpha}_S^2(k)$ by the recursive Eqn. (19).

$$\hat{\alpha}^2(k) = F(z)(1-z^{-1})[\hat{\alpha}_S^2(k) - \hat{\alpha}^2(k-1)] \qquad (19)$$

In the type II filter 165 and the Eqn. (19) z denotes the Z-transform and F(z) is the filtering operator on the prediction error $[\hat{\alpha}_S^2(k) - \hat{\alpha}^2(k-1)]$ and in the preferred embodiment is given by Eqns. (20)-(22).

$$F(z) = \gamma d + \frac{\gamma d^2}{1 - z^{-1}} \qquad (20)$$

$$\gamma = 4\zeta^2 \qquad (21)$$

$$d = \frac{4B_A T_s}{\gamma + 1} \qquad (22)$$

In Eqns. (20)-(22), $T_s$ is equal to the sampling period which is equal to the modulation symbol period, $\zeta$ is the damping coefficient, and $B_A$ is the desired loop bandwidth for the estimation of $\alpha(k)$. In an alternative embodiment of the invention, the type II filter 165 may be replaced by a first order filter with its output $\hat{\alpha}^2(k)$ related to the preliminary sample estimate $\hat{\alpha}_S^2(k)$ by the recursive Eqn. (23).

$$\hat{\alpha}^2(k) = \lambda_s \hat{\alpha}^2(k-1) + (1-\lambda_s)\hat{\alpha}_S^2(k) \qquad (23)$$

In Eqn. (23) $\lambda_s$ is a constant between 0 and 1 and determines the filter averaging period which is approximately equal to $[1/(1-\lambda_S)]$ samples. In general for relatively small fade envelope bandwidths it is preferred to use the first order filter whereas for the case of relatively large fade envelope bandwidths the use of type II filter is preferred.

Referring to FIG. 4, the final fade amplitude estimate $\hat{\alpha}(k)$ 190 is the output of the square-root processor 185 and is related to the final estimate $\hat{\alpha}^2(k)$ by Eq. (24):

$$\hat{\alpha}(k) = \sqrt{\hat{\alpha}^2(k)} \qquad (24)$$

Figure 5:
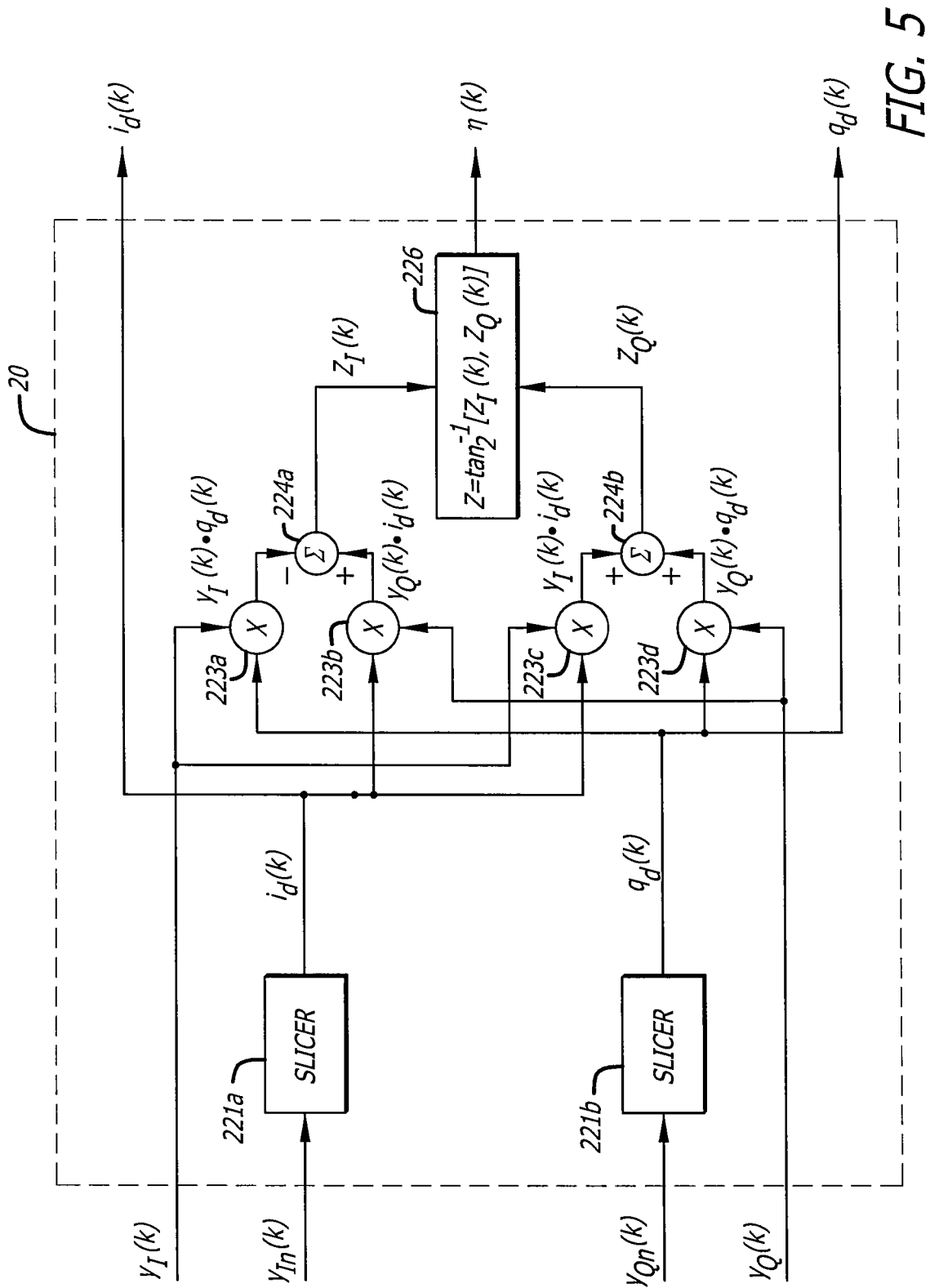
FIG. 5 is a block diagram of a preferred embodiment of a phase detector;.

Referring to FIG. 1, the non fading normalized sampled baseband signals $y_{In}(k)$ and $y_{Qn}(k)$ at the output of the adaptive signal processor 15 are input to the phase detector 20 of the adaptive phase tracking loop. The adaptive phase tracking loop is comprised of the phase detector 20, the Kalman filter 25, and the NCO 30 (numerically controlled oscillator) in addition to the complex mixer 10, SRRC filters 8a, 8b, ADCs 9a, 9b and the adaptive signal processor 15. Referring to FIG. 5 depicting the block diagram of the phase detector, the non fading normalized sampled baseband signals $y_{In}(k)$ and $y_{Qn}(k)$ are input to slicers 221a and 221b respectively. For the example QAM modulation scheme, the slicer 221a compares the input $y_{In}(k)$ against (K−1) number of thresholds $V_{T,j}=2j$; $j=-(K_h-1), \ldots, -1, 0, 1, \ldots (K_h-1)$ with $K_h=K/2$, and determines the inphase detected signal $i_d(k)$ at the output according to Eqn. 25.

$$i_d(k) = \begin{cases} 0.5(V_{T,j} + V_{T,j+1}); & V_{T,j} \leq y_{I,n}(k) < V_{T,j+1}; \quad j = -(K_h, \ldots, -1, 0, 1, \ldots, K_h) \\ -(K-1); & y_{I,n}(k) < V_{T,-(K_h-1)} \\ (K-1); & V_{T,(K_h-1)} \leq y_{I,n}(k) \end{cases} \qquad (25)$$

The operation of slicer 221b is similar to that of 221a and compares the input $y_{Qn}(k)$ against (K−1) number of thresholds $V_{T,j}=2j$ ; $j=-(K_h-1), \ldots, -1, 0, 1, \ldots (K_h-1)$ with $K_h=K/2$, and determines the quadrature detected signal $q_d(k)$ at the output according to Eqn. 25. The inphase and quadrature detected signals $i_d(k)$ and $q_d(k)$ are combined into the complex detected symbol $s_d(k)$ in the data combiner 35. The data combiner 35 provides the detected symbol $s_d(k)$ to the detected symbol output 40.

Referring to FIG. 5, the normalized sampled baseband signal $y_I(k)$ is input to multipliers 223a and 223c. The normalized sampled baseband signals $y_Q(k)$ is input to multipliers 223b and 223d. The second input of multipliers 223a and 223d is $q_d(k)$ while the multipliers 223b and 223c have $i_d(k)$ as their second input. The output of multiplier 223a is subtracted from the output of multiplier 223b in the adder 224a to generate the first error signal $Z_I(k)$ at the output of the adder 224a. Similarly the output of multiplier 223c is added to the output of multiplier 223d in the adder 224b to generate the second error signal $Z_Q(k)$ at the output of the adder 224b. The error signals $Z_I(k)$ and $Z_Q(k)$ are related to the normalized sampled baseband signals $y_I(k)$ and $y_Q(k)$ and the detected signals $i_d(k)$ and $q_d(k)$ by Eqns. (26) and (27).

$$Z_I(k) = y_Q(k)i_d(k) - y_I(k)q_d(k) \qquad (26)$$

$$Z_Q(k) = y_I(k)i_d(k) + y_Q(k)q_d(k) \qquad (27)$$

In the absence of errors made in the generation of the detected signals $i_d(k)$ and $i_q(k)$, the error signals $Z_I(k)$ and $Z_Q(k)$ are related to the phase tracking error $\tilde{\theta}(k)=\theta(k)-\hat{\theta}(k)$ by equations (28) and (29).

$$Z_I(k) = \frac{\alpha(k)A_0 A_d^2(k)}{\hat{A}_0(k)} \sin[\tilde{\theta}(k)] + \tilde{v}_I(k) \tag{28}$$

$$Z_Q(k) = \frac{\alpha(k)A_0 A_d^2(k)}{\hat{A}_0(k)} \cos[\tilde{\theta}(k)] + \tilde{v}_Q(k) \tag{29}$$

In Eqns. (28) and (29) $\tilde{v}_I(k)$ and $\tilde{v}_Q(k)$ denoting the noise dependent terms. In the absence of errors made in the generation of the detected signals $i_d(k)$ and $i_q(k)$ and in the absence of fading, the noise terms $\tilde{v}_I(k)$ and $\tilde{v}_Q(k)$ are statistically independent and have variance approximately equal to $\sigma_{\tilde{v}_I}^2$ which is given by $$\sigma_{\tilde{v}_I}^2 = \frac{\beta^2}{m}\left(\frac{2E_b}{N_0}\right)^{-1} \tag{30}$$

The error signals $Z_I(k)$ and $Z_Q(k)$ are input to the inverse tangent block 226 which computes the prediction error signal $\eta(k)$ as the four quadrant inverse tangent function from the inphase and quadrature error signals $Z_I(k)$ and $Z_Q(k)$. For relatively small phase error the prediction error $\eta(k)$ has an approximate representation given by Eqn. (31) wherein $\tilde{v}(k)$ is the noise term.

$$\eta(k) = \tan(\tilde{\theta}(k)) + \tilde{v}(k) \simeq \tilde{\theta}(k) + \tilde{v}(k) \tag{31}$$

The variance of $\tilde{v}(k)$ is approximately equal to R given by (32):

$$R = \frac{1}{m}\left(\frac{2E_b}{N_0}\right)^{-1} \tag{32}$$

In order to derive the estimate of the phase noise process $\theta(k)$ which may arise from the NCO or induced by the fading communication channel or both, the phase noise process $\theta(k)$ is modeled in terms of a state space model. A Kalman filter and a fixed lag smoother are used in the invention to provide two different estimates of $\theta(k)$. For this purpose the phase noise process is modeled by the second-order state space model described by Eqns. (33)-(37).

$$\theta(k+1) = H^T(k+1)x(k+1) \tag{33}$$

$$x(k+1) = \Phi x(k) + w(k) \tag{34}$$

where T denotes the matrix transpose, $$H^T(k+1) = a(k+1)[1\ 0] \tag{35a}$$

and for any integers k and j $$E[w(k)] = 0 \tag{35b}$$

$$E[w(k)\tilde{v}(j)] = 0 \tag{35c}$$

$$E[w(k)w^T(k)] = Q \tag{35d}$$

$$Q = \begin{bmatrix} \frac{T_s^2}{3} & \frac{T_s}{2} \\ \frac{T_s}{2} & 1 \end{bmatrix} \sigma_a^2 T_s^2 \tag{35e}$$

$$E[\tilde{v}(k)\tilde{v}^T(k)] = R \tag{35f}$$

The state transition matrix $\Phi$ in (33) is given by $$\Phi = \begin{bmatrix} 1 & T_S \\ 0 & 1 \end{bmatrix} \tag{36}$$

In Eqn. (35) $T_s$ is the sampling period. The noise term $\tilde{v}(k)$ in Eqn. (35) is the noise appearing in the prediction error $\eta(k)$ given by (31). It has been shown above that in the absence of fading the variance R of $\tilde{v}(k)$ is approximately equal to $(2mE_b/N_0)^{-1}$. The ratio $(\sigma_a^2/\sigma_v^2)$ determines the effective loop bandwidth of the carrier tracking loop. In the first preferred embodiment, $a(k+1)$ in (35a) is set equal to 1 for all integers k. In various possible modifications of the invention, state space models of order higher than 2 may be used and such modifications remain within the scope of this invention. In the state space model described by Eqns. (33)-(36), the state vector $x(k)$ is of dimension 2 and has the phase $\theta(k)$ and the derivative of phase at time instance k as its components. The Kalman filter state and covariance matrix update equations for $k=0, 1, \ldots$ are given by Eqns. (37a)-(37g). The update equations (37) are initialized with some appropriate initial estimates $\hat{x}(0/0)$ and $P(0/0)$.

$$\hat{x}(k/k) = \hat{x}(k/k-1) + K_0(k)\eta(k) \tag{37a}$$

$$\hat{x}(k/k-1) = \Phi \hat{x}(k-1/k-1) \tag{37b}$$

$$P(k/k-1) = \Phi P(k-1/k-1)\Phi + Q \tag{37c}$$

$$S(k) = H^T(k)P(k/k-1)H(k) + R \tag{37d}$$

$$P(k/k) = P(k/k-1) - P(k/k-1)H(k)S^{-1}(k)H^T(k)P(k/k-1) \tag{37e}$$

$$K_0(k) = P(k/k-1)H(k)S^{-1}(k) \tag{37f}$$

Figure 6:
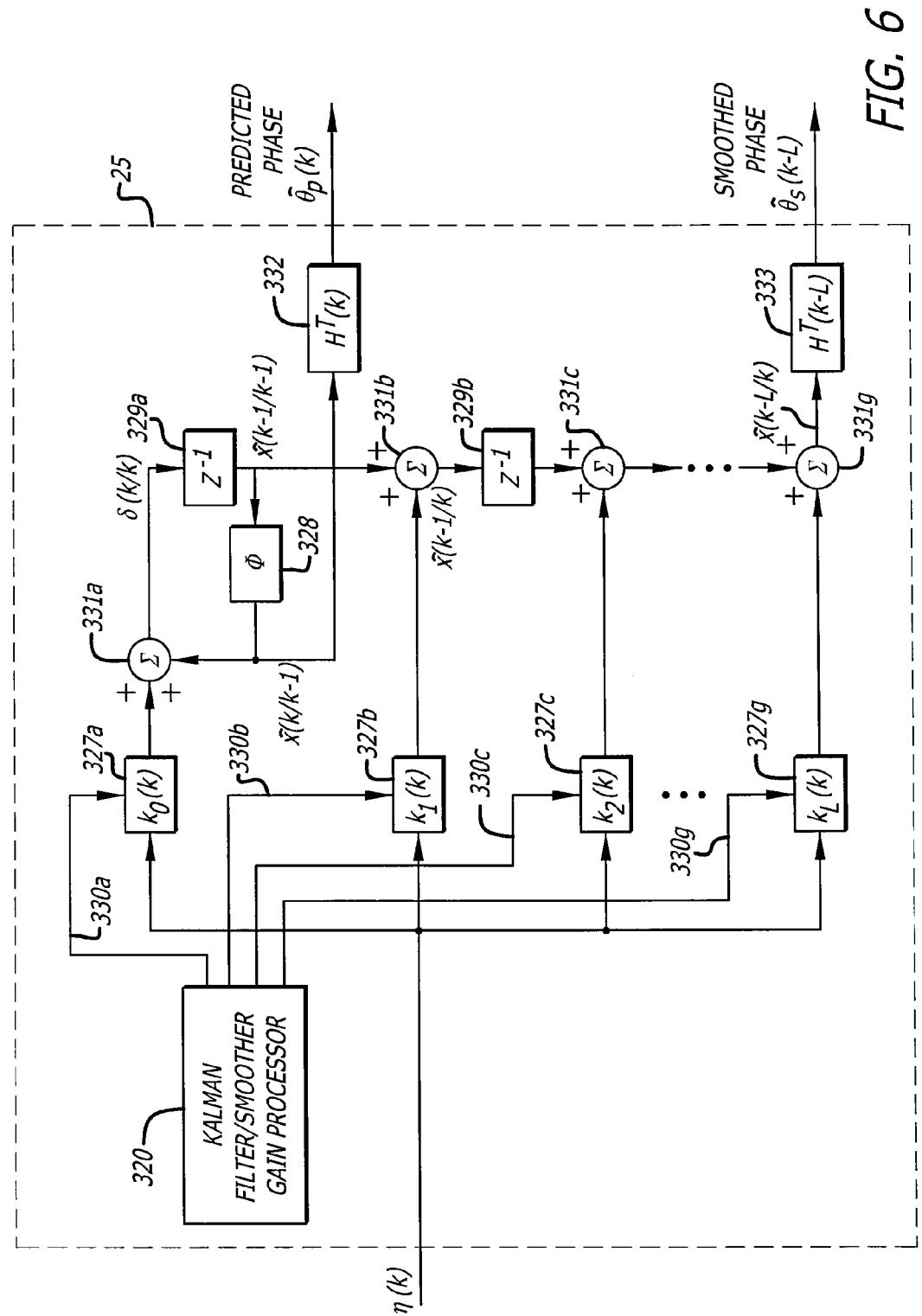
FIG. 6 is a block diagram of a preferred embodiment of the Kalman Filter/Fixed-Lag Smoother of FIG. 1.

In Eqn. (37) $\hat{x}(k-1/k-1)$ and $\hat{x}(k/k-1)$ respectively denote the filtered and predicted state estimates, $P(k-1/k-1)$ and $P(k/k-1)$ are the respective error covariance matrices corresponding to these two state estimates, and $K_0(k)$ denotes the Kalman gain vector. Referring to FIG. 6 the Kalman filter/smoother gain processor 320 generates the Kalman gain vector $K_0(k)$ 330*a*, the prediction error is multiplied by the Kalman gain vector $K_0(k)$ in 327*a* to provide a correction to the predicted state $\hat{x}(k/k-1)$ in the adder 331*a* to generate the filtered state $\hat{x}(k/k)$ at the output of the adder 331*a*. The filtered state $\hat{x}(k/k)$ delayed by the delay 329*a* and multiplied by the state transition matrix $\Phi$ in block 328 provides the predicted state $\hat{x}(k/k-1)$ to the adder 331*a* for generation of the filtered state $\hat{x}(k/k)$.

The Kalman filter described by Eqns. (37) may also be replaced by an exponentially weighted Kalman filter. The predicted phase estimate $\hat{\theta}_P(k)$ which is the estimate of the phase $\theta(k)$ derived from the sampled matched filter output signals $Y_I(j)$ and $Y_Q(j)$ for $j=0, 1, \ldots, k-1$ is given in terms of the predicted state estimate $\hat{x}(k+1/k)$ by Eqn. (38):

$$\hat{\theta}_P(k) = \hat{\theta}(k/k-1) = H^T(k)\hat{x}(k/k-1) \tag{38}$$

The predicted phase estimate $\hat{\theta}_P(k)$ as computed in the Kalman filter/Smoother 25 is input to NCO 30. The NCO 30 transfers the phase to its output 32 such that the phase $\hat{\theta}_P(t)$ in Eqn. (4) at time $t=kT_s$ is equal to $\hat{\theta}_P(k)$. The NCO output 32 is the continuous time signal $v_{LO}(t)$ given by Eqn. (4). Referring to FIG. 1, the NCO output 32 is input to the complex mixer 10 for the generation of mixer output signals 7a and 7b.

In order to achieve a smaller phase tracking error than possible with the Kalman filter, the invention includes a fixed lag smoother. The fixed lag smoother further reduces the phase tracking error by basing the estimate of phase θ(k) on not only the sampled matched filter output signals $Y_I(j)$ and $Y_Q(j)$ for j=0, 1, . . . ,k, but also on some future sampled matched filter output signals $Y_I(j)$ and $Y_Q(j)$ for j=k+1, k+2, . . . , k+L for some positive integer L known as smoother lag for any time k. The fixed lag smoother involves a delay of L in the estimate of the phase. The fixed lag smoother operates in conjunction with the Kalman filter and is described by Eqns. (37) and (39) for i=1, 2, . . . L and k=1, 2, . . . .

$$\hat{x}_i(k/k) = \hat{x}_{i-1}(k-1/k-1) + K_i(k)\eta(k) \quad (39a)$$

$$K_i(k) = P_{i0}(k/k-1)H(k)S^{-1}(k) \quad (39b)$$

$$P_{i0}(k/k) = P_{i0}(k/k-1) - P_{i0}(k/k-1)H(k)S^{-1}(k)H^T(k)P_{00}(k/k-1) \quad (39c)$$

$$P_{ii}(k/k) = P_{ii}(k/k-1) - P_{i0}(k/k-1)H(k)S^{-1}(k)H^T(k)P_{i0}^T(k/k-1) \quad (39d)$$

$$P_{ii}(k/k-1) = P_{i-1,i-1}(k-1/k-1) \quad (39e)$$

In Eqn. (39a) $\hat{x}_i(k/k)$ denotes the estimate of x(k) with a lag i and is thus equal to $\hat{x}(k-i/k)$ for i=1, 2, . . . , L with a similar definition for $\hat{x}_i(k/k-1)$. Also, in Eqn. (39a) $\hat{x}_0(k/k)$ is equal to the Kalman filter estimate obtained from Eqn. (37a). In Eqns. (39) $P_{ii}(k)$ denotes the error covariance matrix associated with the estimate $\hat{x}_i(k/k)$ with $P_{00}(k)$ equal to the filter error covariance matrix P obtained from Eqn. (37e). In Eqn. (39b), $K_i(k)$ denotes the smoother gain vectors for i=1, 2, . . . , L. Referring to FIG. 6, the Kalman filter/smoother gain processor generates the smoother gain vectors $K_i(k)$ for i=1, 2, . . . , L from Eqns. (39b)-(39e). The fixed delay smoother state equation (39a) is implemented by smoother gain multipliers 327b, c, . . . , g, smoother vector summers 331b, c, . . . , g, and the smoother delays 329b, c, . . . , g-1 where g is equal to smoother fixed delay L. The signals $\hat{x}(k-i/k)$ at the output of the smoother vectors summers 331b, c, . . . , g are the smoothed state estimates with delay 1, 2, . . . , L with the output of the smoother vectors summer 331g equal to the final smoothed state estimate.

The smoothed phase estimate $\hat{\theta}_S(k-L)$ at the output of Kalman Filter/Fixed lag smoother 25 is given by Eqn. (40):

$$\hat{\theta}_S(k-L) = H^T(k-L)\hat{x}_L(k/k) = H^T(k-L)\hat{x}(k-L/k) \quad (40)$$

where the smoothed state estimate $\hat{x}_L(k/k)$ is given by recursions (39a). The vector multiplier 333 in FIG. 6 implements Eqn. (40) generating the smoothed phase estimate $\hat{\theta}_S(k-L)$ at the output.

Figure 7:
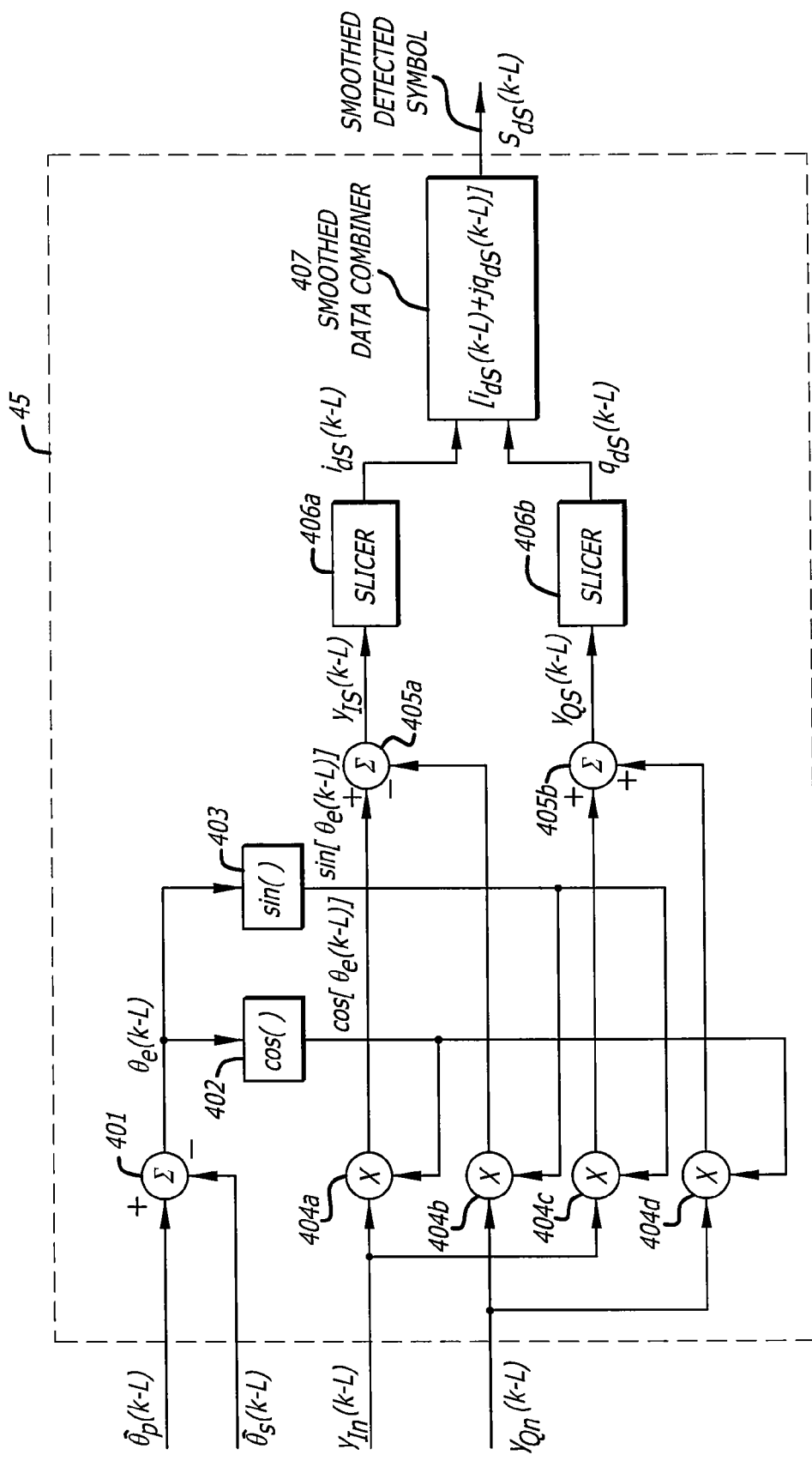
FIG. 7 is a block diagram of a preferred embodiment of a smoothed symbol detector.

The smoothed phase estimate $\hat{\theta}_S(k)$ is used to obtain more accurate estimate of the real and imaginary parts $i_{dS}(k)$ and $q_{dS}(k)$ of the symbol s(k) by the smoothed symbol detector 45. Referring to FIG. 1, the smoothed phase estimate $\hat{\theta}_S(k-L)$, the predicted phase estimate with delay $\hat{\theta}_P(k-L)$, and the delayed non fading normalized sampled baseband signals $y_{In}(k-L)$ and $y_{Qn}(k-L)$ are input to smoothed symbol detector 45 from the Kalman Filter/Fixed Lag Smoother 25. The smoothed symbol detector 45 outputs the smoothed detected symbol $s_{dS}(k)$ to the smoothed detected symbol output 50. Referring to FIG. 7, the smoothed phase estimate $\hat{\theta}_S(k-L)$ and the delayed predicted phase estimate $\hat{\theta}_P(k-L)$ are input to adder 401a to generate the phase difference signal $\theta_e(k-L)$ at the output. The phase difference signal $\theta_e(k)$ is input to a cosine function block 402a and a sine function block 403. The output of the cosine function block 402a is input to the multipliers 404a and 404d. The output of the sine function block 403 is input to the multipliers 404b and 404c. The other input to the multipliers 404a and 404c is the delayed non fading normalized sampled baseband inphase signal $y_{In}(k-L)$. The other input to the multipliers 404b and 404d is the delayed nonfading normalized sampled baseband quadrature signal $y_{Qn}(k-L)$. The output of multiplier 404b is subtracted from the output of multiplier 404a to provide the smoothed inphase signal $y_{IS}(k-L)$ given by Eqn. 41. Similarly the outputs of multiplier 404c is added to the output of multiplier 404d to provide the smoothed quadrature signal $y_{QS}(k-L)$ given by Eqn. 42.

$$y_{IS}(k-L) = y_{In}(k-L)\cos(\theta_e(k-L)) - y_{Qn}(k-L)\sin(\theta_e(k-L)) \quad (41)$$

$$y_{QS}(k-L) = y_{In}(k-L)\sin(\theta_e(k-L)) + y_{Qn}(k-L)\cos(\theta_e(k-L)) \quad (42)$$

The smoothed inphase signal $y_{IS}(k-L)$ is input to a slicer 406a similar to the slicers 221a and 221b and described by Eqn. 25 to provide smoothed detected real component $i_{d,s}(k-L)$ at the output of the slicer 406a. Similarly the smoothed quadrature signal $y_{QS}(k-L)$ is input to a slicer 406b to provide smoothed detected imaginary component $q_{d,s}(k-L)$ at the output of 406b. The smoothed inphase and quadrature components $y_{IS}(k-L)$ and $y_{QS}(k-L)$ are input to smoothed data combiner 407, which combines the smoothed inphase and quadrature components into the smoothed detected symbol $s_{dS}(k-L)$. Referring to FIG. 1, the smoothed detected symbol $s_{dS}(k-L)$ is outputted to the smoothed detected symbol output block 50.

Figure 8:
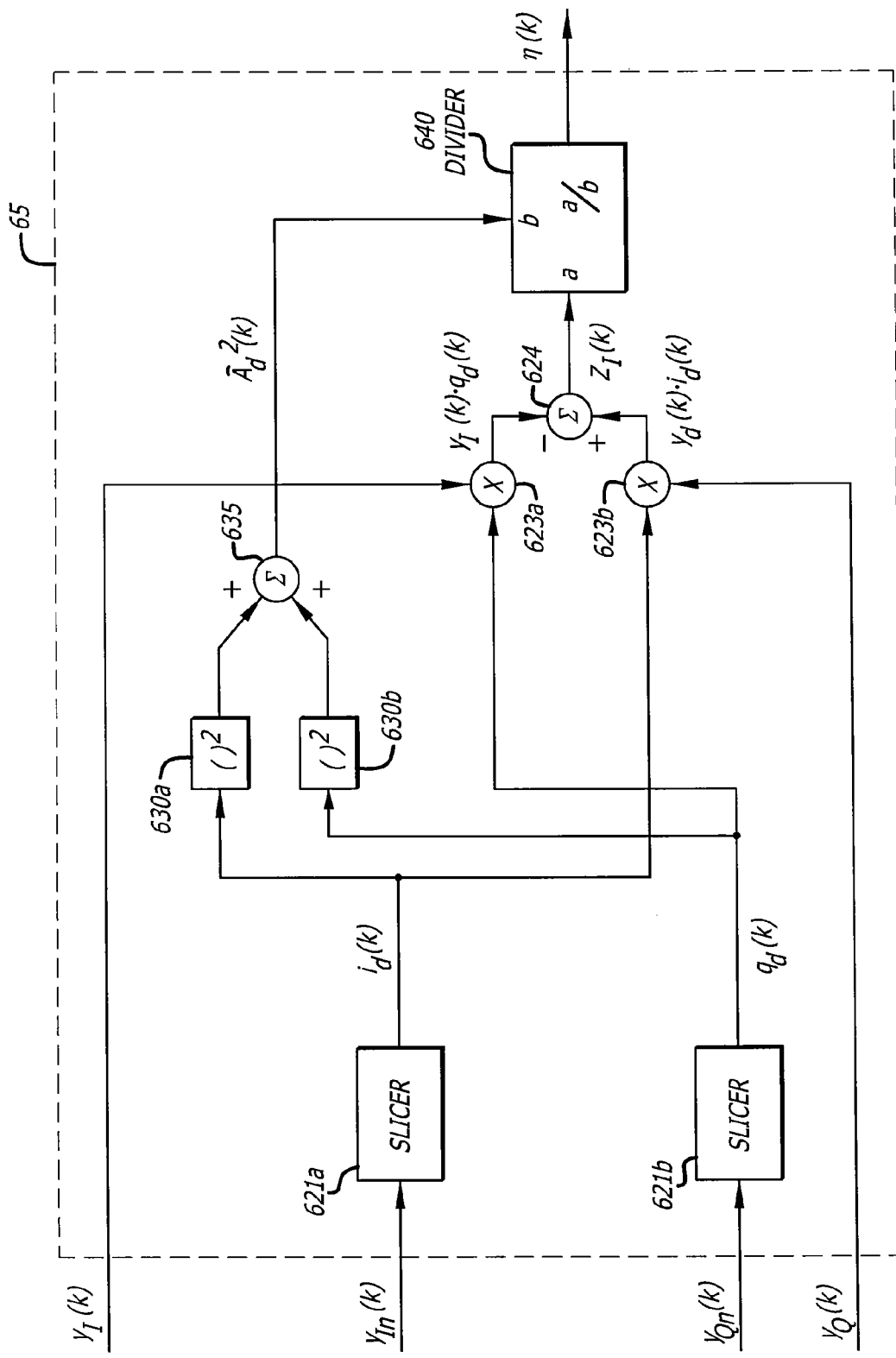
FIG. 8 is a block diagram of a second preferred embodiment of a phase detector.

In an alternative embodiment of this invention, the phase detector 20 in FIG. 1 is replaced by phase detector II shown in FIG. 8. Referring to FIG. 8, the non fading normalized sampled baseband signals $y_{In}(k)$ and $y_{Qn}(k)$ are input to slicers 621a and 621b respectively. The slicer 621a compares the input $y_{In}(k)$ against (K-1) number of thresholds $V_{T,j}=2j$; j=-(K_h-1), . . . , -1, 0, 1, . . . (K_h-1) with $K_h=K/2$, and determines the inphase detected signal $i_d(k)$ at the output according to Eqn. 43.

$$i_d(k) = \begin{cases} 0.5(V_{T,j} + V_{T,j+1}); & V_{T,j} \le y_{I,n}(k) < V_{T,j+1}; \quad j = -(K_h, \ldots, -1, 0, 1, \ldots, K_h) \\ -(K-1); & y_{I,n}(k) < V_{T,-(K_h-1)} \\ (K-1); & V_{T,(K_h-1)} \le y_{I,n}(k) \end{cases} \quad (43)$$

The operation of slicer 621b is similar to that of 621a and compares the input $y_{Qn}(k)$ against (K-1) number of thresholds $V_{T,j}=2j$; j=-(K_h-1), . . . , -1, 0, 1, . . . (K_h-1) with $K_h=K/2$, and determines the quadrature detected signal $q_d(k)$ at the output according to Eqn. 43.

Referring to FIG. 8 the normalized sampled baseband signal $y_I(k)$ is input to multiplier 623a and the non fading normalized sampled baseband signal $y_Q(k)$ is input to multiplier 623b. The second inputs of multipliers 623a and 623b are $q_d(k)$ and $i_d(k)$, respectively. The output of multiplier 623a is subtracted from the output of multiplier 623b to generate the error signal $Z_I(k)$ at the output of the adder 624. The inphase and quadrature detected signals $i_d(k)$ and $q_d(k)$ are input to the squaring blocks 630a and 630b respectively. The outputs of the squaring blocks 630a and 630b are added by the adder 635 to generate the estimate $\hat{A}_d^2$ of the square of the data amplitude $A_d$ at the output of the adder 635. The estimate $\hat{A}_d^2$ is input to the divider 640 with the other input of the divider 640 connected to the output $Z_f(k)$ of the adder 624. The output of the divider 640 is the prediction error $\eta(k)$ equal to $Z_f(k)/\hat{A}_d^2$. The error signal $Z_f(k)$ is related to the non fading normalized sampled baseband signals $y_I(k)$ and $y_Q(k)$ and the detected signals $i_d(k)$ and $q_d(k)$ by Eqn. (26), and the prediction error $\eta(k)$ is given by $$\eta(k) = \frac{\alpha(k)A_0 A_d^2(k)}{\hat{A}_0(k)\hat{A}_d^2(k)} \sin[\tilde{\theta}(k)] + \tilde{v}_{In}(k) \qquad (44)$$

The variance of the noise $\tilde{v}_{In}(k)$ is approximately equal to $\sigma_{\tilde{v}_{In}}^2$ given by $$\sigma_{\tilde{v}_{In}}^2 = \frac{1}{m}\left(\frac{2E_b}{N_0}\right)^{-1} \qquad (45)$$

For relatively small phase error the prediction error $\eta(k)$ in (44) has an approximate representation given by Eqn. (46)

$$\eta(k) = \alpha(k)\sin[\tilde{\theta}(k)] + \tilde{v}_{In}(k) \qquad (46)$$

In this alternative embodiment of the invention, the smoother is an adaptive smoother described by Eqns. (37)-(39) with $a(k+1)$ made equal to the fade envelope $\hat{\alpha}(k+1)$ in the definition of the vector $H(k+1)$ in (35a). Both the embodiments of FIGS. 1 and 8 can also be applied to an MPSK modulated signal with the slicers 621a and 621b appropriately modified for the MPSK signal. Such a modification can be made by a person knowledgeable in the art of the field of this invention.

Figure 9:
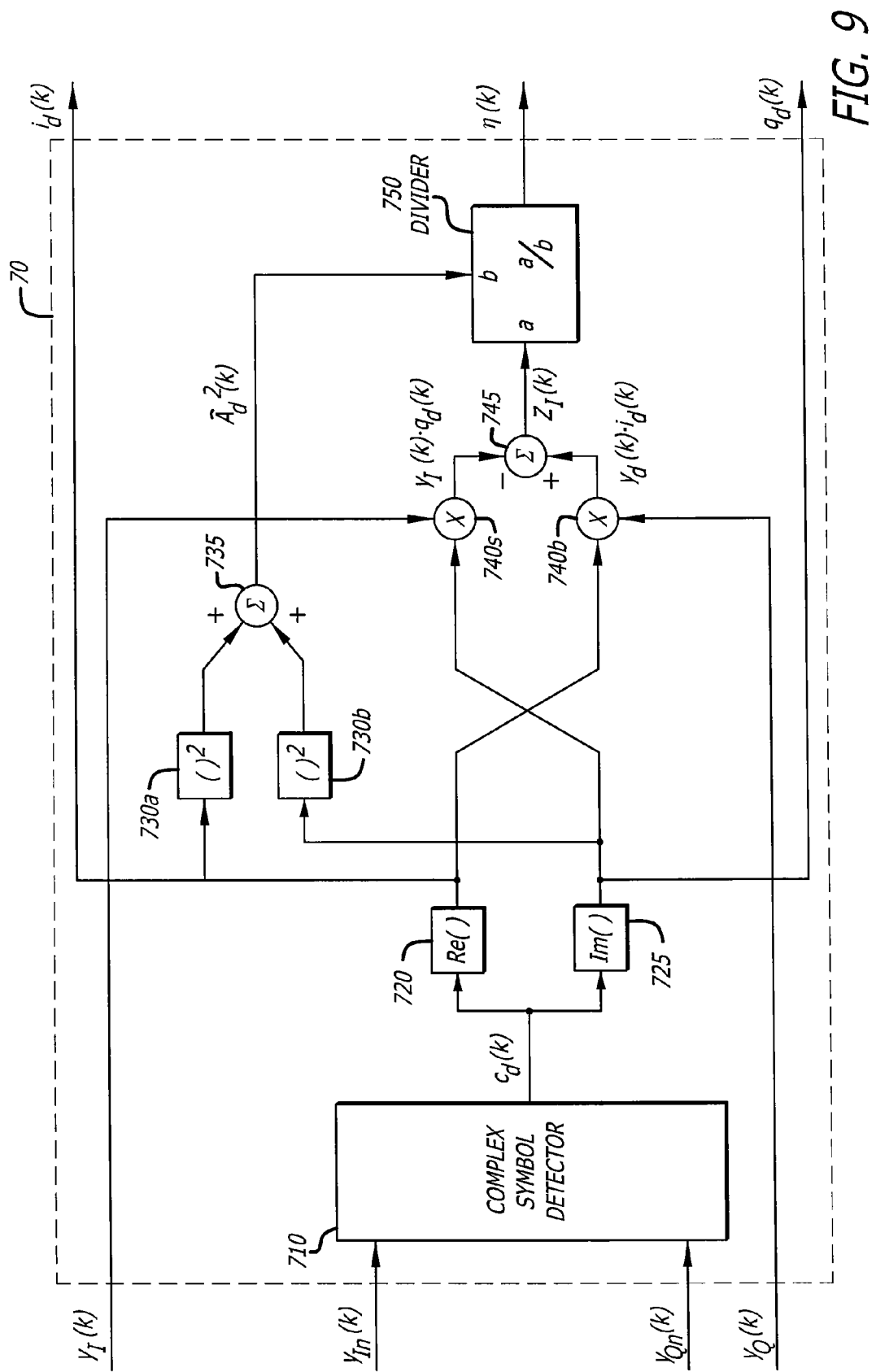
FIG. 9 is a block diagram of a third preferred embodiment of a phase detector.

In a third alternative embodiment of this invention, the phase detector 20 in FIG. 1 is replaced by a more general phase detector III 70 shown in FIG. 9. Referring to FIG. 9, the non fading normalized sampled baseband signals $y_I(k)$ and $y_{Qn}(k)$ are input to the complex symbol detector 710. The complex valued output $c_d(k)$ of the complex symbol detector 710 is input to Re( ) block 720 to generate the real part $i_d(k)$ of $c_d(k)$ at the output of 720. The Im( ) block 725 provides the imaginary part $q_d(k)$ of $c_d(k)$ at the output.

Referring to FIG. 9 the normalized sampled baseband signal $y_I(k)$ is input to multiplier 740a and the normalized sampled baseband signal $y_Q(k)$ is input to multiplier 740b. The second inputs of multipliers 740a and 740b are $q_d(k)$ and $i_d(k)$ respectively. The output of multiplier 740a is subtracted from the output of multiplier 740b to generate the error signal $Z_f(k)$ at the output of the adder 745. The inphase and quadrature detected signals $i_d(k)$ and $q_d(k)$ are input to the squaring blocks 730a and 730b respectively. The outputs of the squaring blocks 730a and 730b are added by the adder 735 to generate the estimate $\hat{A}_d^2$ of the square of the data amplitude $A_d$ at the output of the adder 735. The estimate $\hat{A}_d^2$ is input to the divider 750 with the other input of the divider 750 connected to the output $Z_f(k)$ of the adder 745. The output of the divider 750 is the prediction error $\Theta(k)$ equal to $Z_f(k)/\hat{A}_d^2$. The prediction error $\eta(k)$ is input to the Kalman Filter/Fixed Lag Smoother 25. In a third alternative embodiment of the invention, the smoother is an adaptive smoother described by Eqns. (37)-(39) with $a(k+1)$ made equal to the fade envelope $\hat{\alpha}(k+1)$ in the definition of the vector $H(k+1)$ in (35a) as is true for the second alternative embodiment. The inphase and quadrature detected signals $i_d(k)$ and $q_d(k)$ at the output of phase detector 70 are input to the data combiner 35 of FIG. 1.

Figure 10:
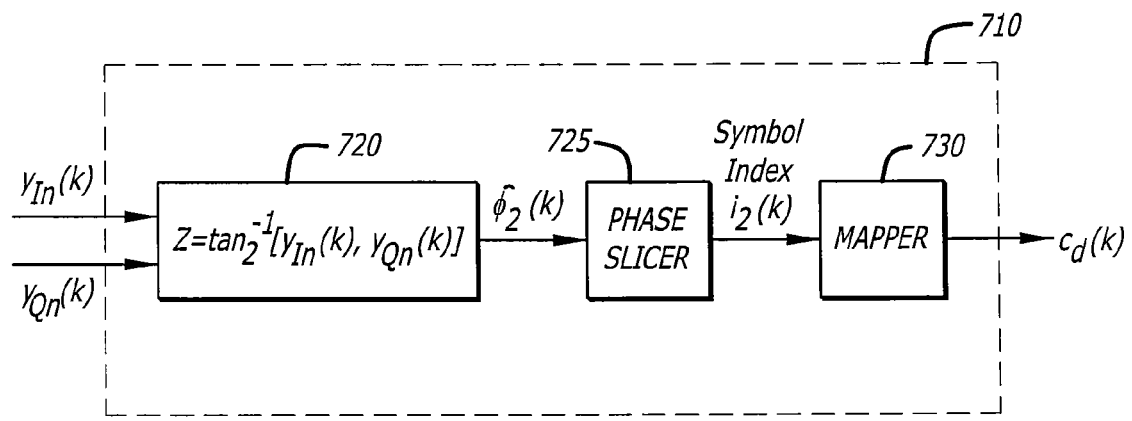
FIG. 10 is a block diagram of a first preferred embodiment of a complex symbol detector of the phase detector of FIG. 9.
Figure 11:
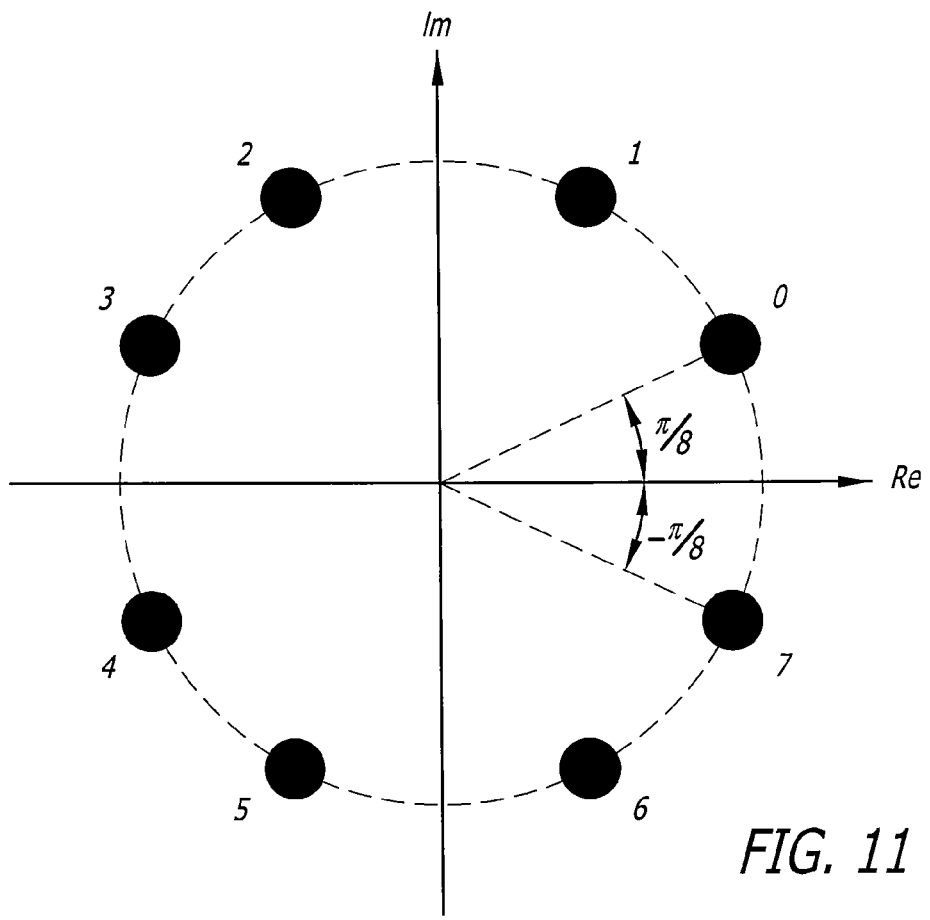
FIG. 11 is a graph depicting a signal constellation diagram for an example MPSK modulation for the case of M=8.

For the example application of the third alternative embodiment of the invention to the MPSK signal, the complex symbol detector 710 is symbol detector for MPSK signal. Referring to FIG. 10, the complex detector for MPSK signal is comprised of inverse tangent block 720, phase slicer 725, and mapper 730. For MPSK signals, the symbol phase $\phi_d(k)$ in Eqn. (5) and (6) has possible values $(2j+1)\pi/M$; $j=0, 1, \ldots, (M-1)$ where M is the number of phases of the MPSK signal. FIG. 11 shows the normalized signal constellation of the MPSK signal for the example M=8 case also depicting the indices of the M symbols.

The output $\hat{\phi}_d(k)$ of the inverse tangent block 720 is the estimate of $\phi_d(k)$. The phase slicer 725 compares $\hat{\phi}_d(k)$ with a set of thresholds equal to $2\pi j/M$, $j=0, 1, \ldots, (M-1)$ and outputs the symbol index $i_s(k)$ according to Eqn. (47).

$$i_s(k) = j; \; \frac{2\pi}{M} j \le \hat{\phi}_d(k) < \frac{2\pi}{M}(j+1) \text{ for } j = 0, 1, \ldots, (M-1) \qquad (47)$$

Figure 12A:
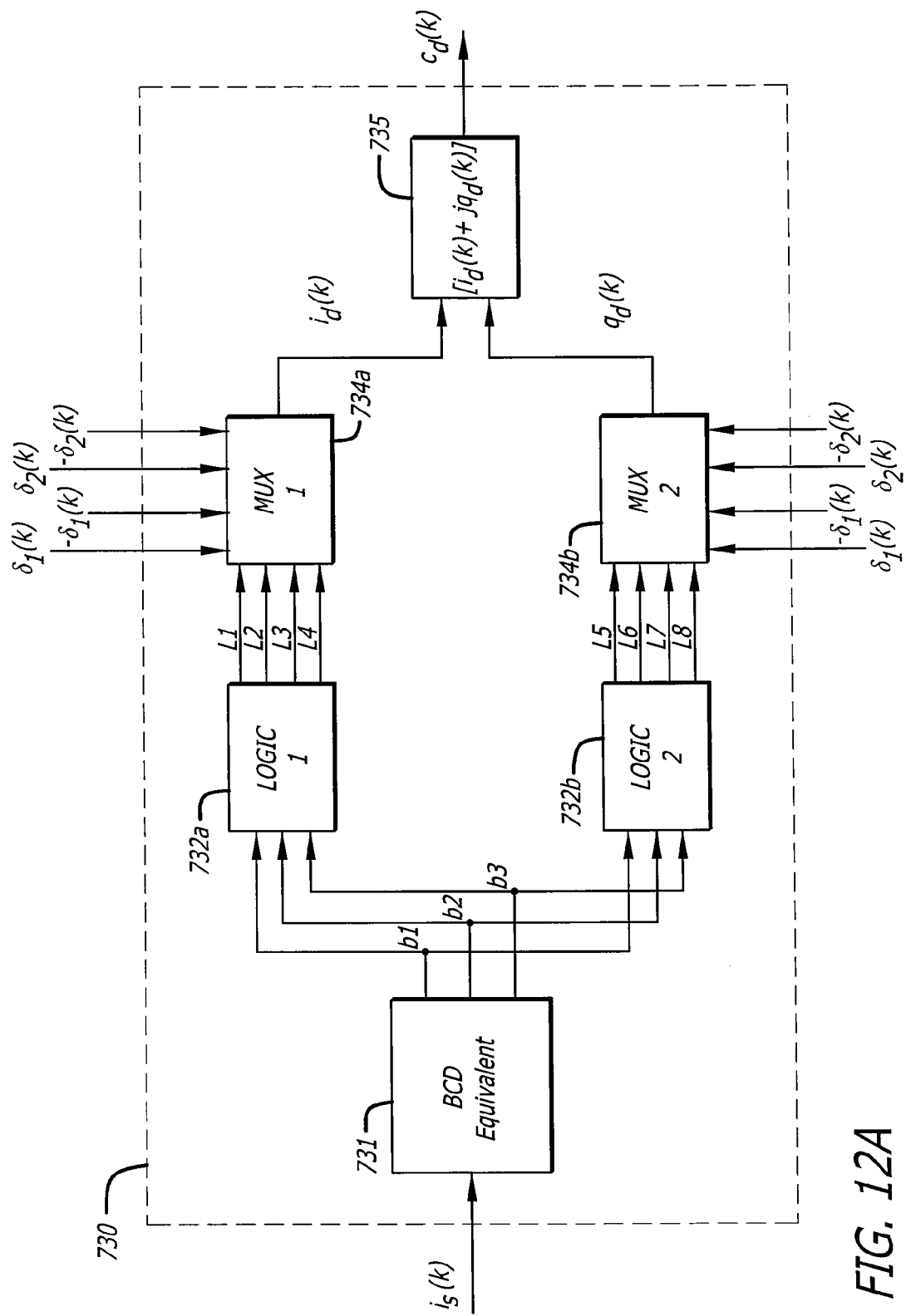
FIG. 12A is a block diagram of a first preferred mapper for the case of M=8.

The mapper 730 outputs the symbol $c_d(k)$ corresponding to the index $i_s(k)$ using the normalized signal constellation. As an example of the mapper, FIG. 12A shows implementation of the mapper 730 for M=8. Referring to FIG. 12A the symbol index $i_s(k)$ is represented in terms of BCD (binary coded decimal) form $b_1 b_2 b_3$. The binary variables $b_1$, $b_2$, and $b_3$ take values 0 or 1 and are input to logic circuit blocks Logic 1 and Logic 2 which generate logic variables $L_1, \ldots, L_8$ at their outputs as shown in FIG. 12A. From the normalized signal constellation in FIG. 11 one obtains the following table 1 depicting the mapping required between $i_s(k)$ and $c_d(k)$. In the table $\delta_1 = \cos(\pi/8)$ and $\delta_2 = \sin(\pi/8)$ and $j = \sqrt{-1}$.

TABLE 1

Mapping from symbol index to symbol

| $i_s$ | $b_1$ | $b_2$ | $b_3$ | $c_d(k)$ |
|---|---|---|---|---|
| 0 | 0 | 0 | 0 | $\delta_1 + j\delta_2$ |
| 1 | 0 | 0 | 1 | $\delta_2 + j\delta_1$ |
| 2 | 0 | 1 | 0 | $-\delta_2 + j\delta_1$ |
| 3 | 0 | 1 | 1 | $-\delta_1 + j\delta_2$ |
| 4 | 1 | 0 | 0 | $-\delta_1 - j\delta_2$ |
| 5 | 1 | 0 | 1 | $-\delta_2 - j\delta_1$ |
| 6 | 1 | 1 | 0 | $\delta_2 - j\delta_1$ |
| 7 | 1 | 1 | 1 | $\delta_1 - j\delta_2$ |

Denoting by $L_1$, $L_2$, $L_3$ and $L_4$ the logic variables which take value 1 only when the real part of $c_d(k)$ takes values $\delta_1$, $-\delta_1$, $\delta_2$, and $-\delta_2$ respectively, otherwise they take value 0. From Table 1, these logic variables have the following Boolean expressions.

$$L_1 = b_1 b_2 b_3 + \bar{b}_1 \bar{b}_2 \bar{b}_3 \qquad (48a)$$

$$L_2 = \bar{b}_1 b_2 b_3 + b_1 \bar{b}_2 \bar{b}_3 \qquad (48b)$$

$$L_3 = \bar{b}_1 \bar{b}_2 b_3 + b_1 b_2 \bar{b}_3 \qquad (48c)$$

$$L_4 = \bar{b}_1 b_2 \bar{b}_3 + b_1 \bar{b}_2 b_3 \qquad (48d)$$

In Eqns.(48) $\bar{b}_i$ denotes logic inverse of $b_i$ for i between 1 and 4. From Table 1, similar expressions can be derived for the logic variables $L_5$ to $L_8$. Referring to FIG. 12A, the logic variables $L_1$, $L_2$, $L_3$ and $L_4$ are input to a multiplexer MUX 1 734a which is also input with constants $\delta_1$, $-\delta_1$, $\delta_2$, and $-\delta_2$.

Figure 12B:
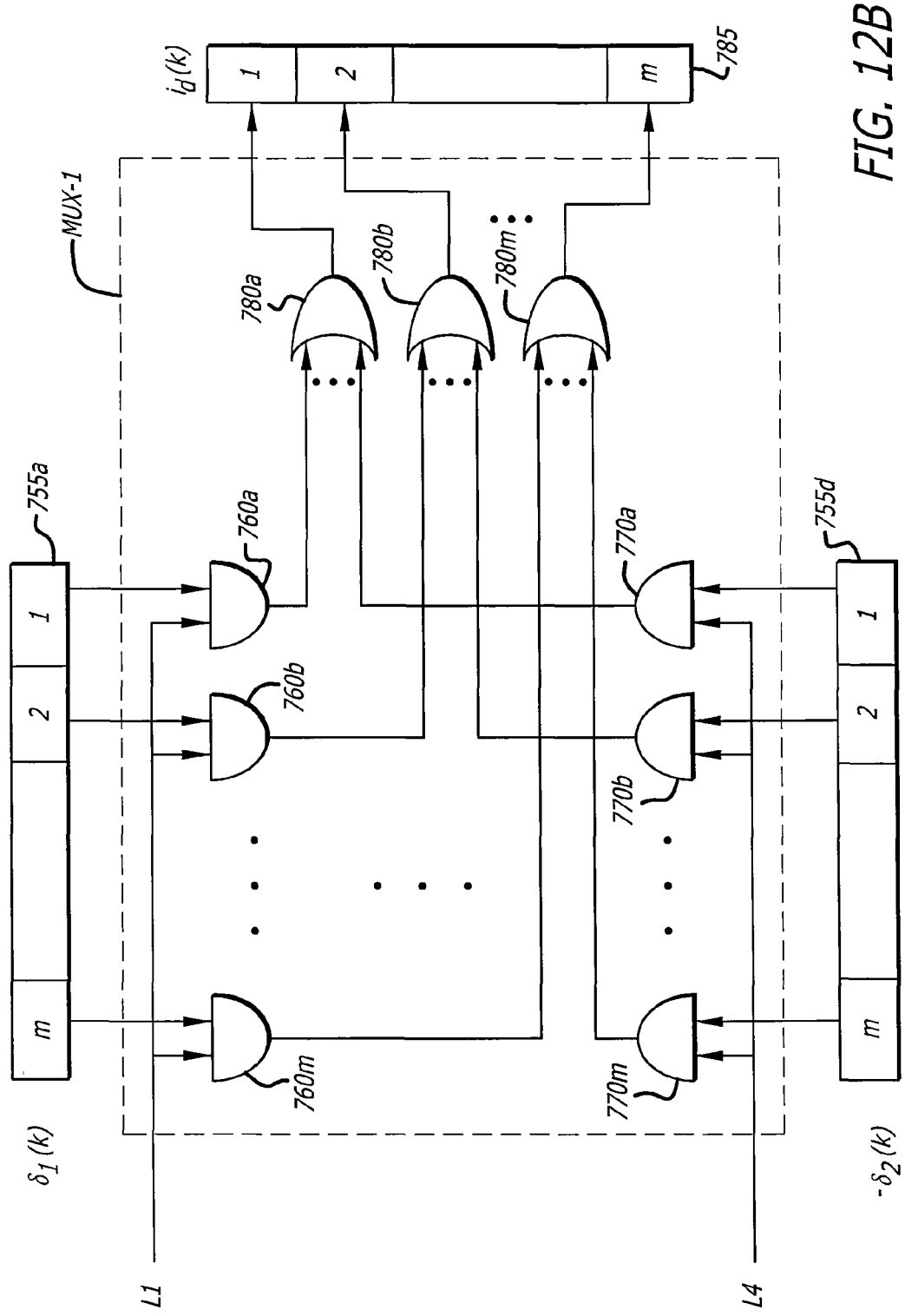
FIG. 12B is a block diagram of a first preferred embodiment of the MUX 1 block of FIG. 12A.

The output of MUX 1 734a $i_d(k)$ is equal to $\delta_1$, $-\delta_1$, $\delta_2$, or $-\delta_2$ depending upon which of the 4 logic variables $L_1, L_2, L_3$ and $L_4$ is equal to 1 in that order. The operation of MUX 2 734b is very similar to that of MUX 1. The inputs of MUX 2 are the logic variables $L_5, L_6, L_7$ and $L_8$ with the output $q_d(k)$ equal to $\delta_1$, $-\delta_1$, $\delta_2$, or $-\delta_2$ depending upon which of the 4 logic variables $L_5, L_6, L_7$ and $L_8$ is equal to 1 in that order. The outputs of MUX 1 734a and MUX 1 734b are input to data combiner block 735 which generates the detected symbol $c_d(k)$ at the output. Referring to FIG. 12B the constants $\delta_1$, $-\delta_1, \delta_2$, and $-\delta_2$ are stored in their signed binary forms in shift registers 755a to 755d. The contents of shift register 755a are input to AND gates 760a through 760m. The other input of the AND gates 760a through 760m is $L_1$. The outputs of the AND gates 760a through 760m are input to the four input OR gates 780a through 780m respectively. The other inputs of the four input OR gates 780a through 780m are generated as a result of logic signals $L_2, L_3$ and $L_4$ gating the shift registers containing $-\delta_1, \delta_2$, and $-\delta_2$ respectively in their binary forms. The outputs of the four input OR gates 780a through 780m are input to shift register 785 which holds the real part $i_d(k)$ of the detected symbol $c_d(k)$. The MUX 2 734b in the likewise manner generates the imaginary part $q_d(k)$ of the detected symbol $c_d(k)$ based on the logic variables $L_5, L_6, L_7$ and $L_8$. The advantage of the implementation of FIG. 9 is that it does not involve any mathematical computations to obtain $c_d(k)$ from $\hat{\phi}_d(k)$. Alternatively $i_d(k)$ and $q_d(k)$ can be obtained as $\cos(\hat{\phi}_d(k))$ and $\sin(\hat{\phi}_d(k))$ which requires computation of trigonometric functions.

It will be understood that the embodiments described herein are merely exemplary and that a person skilled in the art may make many variations and modifications without departing from the spirit and scope of this invention. For example, a square grid for the normalized signal constellation is disclosed as an example. With appropriate changes to the slicers in the phase detector, the invention applies to rectangular and hexagonal grids as well as non-uniform grids. Another variation is the use of higher than type II filter in the adaptive fade envelope estimator which may be appropriate for channels experiencing higher order fade dynamics. Yet another variation is the use of a smoothed fade envelope estimate in the fixed lag smoother. All such variations and modifications are intended to be included within the scope of the invention as defined in the appended claims.

We claim:

1. A system for providing a final smoothed phase estimate of a phase of a carrier from high-order MQAM and MPSK data modulated signals comprising:
   an adaptive phase tracking loop for receiving a high-order modulated input signal and generating a predicted phase for adjusting a reference phase to reduce an error between the phase of the carrier and the reference;
   an adaptive signal processor for estimating a nominal channel gain and an adaptive fade envelope estimation for generating normalized sampled baseband signals and non fading normalized sampled baseband signals;
   an adaptive fade envelope estimator for generating a preliminary sample estimate correlated to the adaptive fade envelope, and for generating a substantially noise free estimate of the fade envelope;
   a phase detector for generating inphase and quadrature detected signals, and for generating a prediction error;
   a Kalman filter/fixed lag smoother for receiving the prediction error, for generating filtered and predicted state estimates, for generating the predicted phase from the predicted state estimate, for generating smoothed state estimates from the filtered state estimates and the prediction error, and for generating a smoothed phase estimate from a final smoothed state estimate, the smoothed phase estimate delayed from the input by a fixed delay; and
   a smoothed symbol detector for receiving a delayed predicated phase, the smoothed phase estimate, and delayed non fading normalized sampled baseband signals, for generating a smoothed detected real component and a smoothed detected imaginary component and a smoothed detected symbol.

2. The system of claims 1 wherein the adaptive signal processor is further for estimating a channel, for normalizing a sampled baseband signals, for generating the fade envelope estimate and for generating non fading normalized sampled baseband signals.

3. The system of claims 2 wherein the fade envelope estimator is further for generating a preliminary sample estimate of a fade envelope and for generating a final estimate of the time-varying fade envelope of a fading channel.

4. The system of claim 1 wherein the phase detector compares the non fading normalized inphase signal against a set of square root of an order of a modulation minus 1 thresholds in a slicer for generating the inphase detected signal at the output of the slicer selected equal to one of real coordinates of the signal points in a normalized signal constellation and for comparing the non fading normalized quadrature signal against a set of square root of the order of the modulation minus 1 thresholds in a second slicer for generating the quadrature detected signal at the output of the second slicer selected equal to one of the imaginary coordinates of the signal points in the normalized signal constellation.

5. The system of claim 1 wherein the phase detector generates products of the detected inphase and quadrature signals with the normalized sampled inphase and quadrature signals, subtracts the product of normalized sampled inphase signal with the quadrature detected signal from the product of normalized sampled quadrature signal with the inphase detected signal generating a first error signal, and adds the product of the normalized sampled quadrature signal with the detected quadrature signal to the product of the normalized sampled inphase signal with the detected inphase signal generating a second error signal, and generates the prediction error signal from the two error signals.

6. The system of claims 5 wherein the prediction error is equal to the four quadrant arc tangent function of the complex signal with the first error signal as the real part and the second error signal as the imaginary part of the said complex signal.

7. The system of claim 5 wherein the prediction error is equal to the first error signal normalized by an estimate of the power of the detected symbol.

8. The system of claim 1 wherein the phase detector generates the detected symbol from the non fading normalized sampled inphase and quadrature signals, for generating detected inphase and detected quadrature signals as real and imaginary parts respectively of the detected symbol, subtracts the product of normalized sampled inphase signal with the detected quadrature signal from the product of normalized sampled quadrature signal with the detected inphase signal generating an error signal, and the phase detector computes the squares of the detected inphase and detected quadrature signals, adds the squared detected inphase and squared detected quadrature signals, generates an estimate of the power of the detected symbol, and normalizes the error signal by the estimate of the power of the detected symbol to generate the prediction error.

9. The system of claim 1 wherein the phase detector is comprised of the complex symbol detector that estimates the data phase as a four quadrant arc tangent function of the complex signal with the arc tangent function of the complex signal with the non fading normalized sampled inphase signal as the real part and the non fading normalized sampled quadrature signal as the imaginary part of the complex signal, and inputs the data phase estimate to a phase slicer, the phase slicer segments the total phase between 0 to $2\pi$ into M consecutive and non overlapping intervals each of length $2\pi$ divided by M, selects one of the 0 to (M−1) intervals containing the data phase estimate, and generates the symbol index of the unique signal point of the normalized signal constellation in the said selected interval at the slicer output.

10. The system of claims in 9 wherein a mapper receives a symbol index from the phase slicer output, and on the basis of pre computed set of real and imaginary coordinates of the signal points in the normalized signal constellation, generates a detected inphase and detected quadrature signals with the logic and digital multiplexer circuits, and combines the detected inphase and quadrature signals generating the detected symbol, wherein a detailed logic circuit is synthesized from a specified mapping between the symbol index and the corresponding detected symbol.

11. The system of claim 9 wherein a multiplexer selects real coordinates of signal points in a normalized signal constellation at the multiplexer input according to which logic variables at the multiplexer input is equal to logic 1, generating the inphase detected signal at the multiplexer output without requiring any arithmetic computations.

12. The system of claims 1 wherein the Kalman filter/fixed lag smoother generates 0 to L plurality of gain vectors for the final estimate of the fade envelope, the $0^{th}$ one of the plurality of the gain vectors adjusts the prediction error for generating the predicted phase estimate in the adaptive phase tracking loop for adjusting the phase of the reference numerically controlled oscillator, and to generate $0^{th}$ smoothed state estimate, the fixed lag smoother adjusting the inphase prediction error by the 1 to L remaining of a plurality of gain vectors, and for successively delaying and adjusting the $0^{th}$ smoothed state estimate and for respectively generating a respective plurality of 1 to L smoother state estimates, and extracting the final smoothed phase estimate from the Lth smoothed state estimate.

13. The system of claim 1 wherein the smoothed symbol detector is for further subtracting the final smoothed phase estimate from the delayed predicted phase estimate for providing a smoother phase correction, for evaluating the cosine and sine of the phase correction signal, for generating the products of the inphase and quadrature non fading normalized sampled baseband signals with the cosine and sine of the phase correction signal respectively, for subtracting the product of quadrature non fading normalized sampled baseband signal with the sine of the phase correction signal from the product of inphase non fading normalized sampled baseband signal with the cosine of the phase correction signal for generating smoothed inphase signal, for adding the product of inphase non fading normalized sampled baseband signal with the sine of the phase correction signal to the product of quadrature non fading normalized sampled baseband signal with the cosine of the phase correction signal for generating smoothed quadrature signal, and comparing the smoothed inphase signal against a set of square root of the order of modulation M minus 1 thresholds in a first slicer for generating the smoothed detected inphase component selected equal to the real coordinate of one of the signal points in the normalized signal constellation and comparing the smoothed quadrature signal against a set of square root of the order of modulation M minus 1 thresholds in a second slicer for generating the smoothed detected quadrature component selected equal to the imaginary coordinate of one of the signal points in the normalized signal constellation, and for combining the smoothed detected inphase component with the smoothed detected quadrature component for generating the smoothed detected symbol, wherein the said selected real coordinate is the coordinate in between the two thresholds that enclose and are closest to the smoothed inphase signal at the first slicer input if the smoothed inphase signal is in between the maximum and minimum of the set of the said thresholds, and the said selected real coordinate is equal to the closest of the two real outermost real coordinates in the normalized signal constellation otherwise.

14. An adaptive communication receiver for demodulation of digitally modulated signals received over wireless communications channels exhibiting fading without requiring a carrier pilot signal, the receiver comprising:

a complex mixer having a real component and a phase shift component providing complex baseband signal;

an adaptive signal processor having a channel gain estimator and an adaptive fade envelope estimator to track an instantaneous fade envelope and for normalizing a filtered complex baseband signal matching an amplitude of a normalized signal to threshold levels of slicers in a carrier phase detector;

a phase detector including first and second slicers for determining inphase and quadrature detected signals and eliminating data phase estimate from a phase of the complex baseband signal generating carrier phase tracking error;

an adaptive Kalman filter that adapts to channel fading and provides for providing estimates of a carrier phase noise process;

a numerically controlled oscillator providing a reference oscillator signal;

an adaptive fixed lag smoother that adapts to channel fading and provides smoothed carrier phase estimate with reduced for reducing a phase tracking error; and an adaptive smoothed symbol detector having first and second slicers to estimate smoothed detected symbol real and imaginary components based on smoothed carrier phase estimate, and a smooth data combiner for converting combining the real and imaginary components into a complex smoothed detected symbol.

15. The adaptive receiver of claim 14 wherein said digitally modulated signals are MQAM signals.

16. The adaptive receiver of claim 15 wherein said MQAM signals have an M greater than 4.

17. The adaptive receiver of claim 14 wherein said wireless communications encompass MPSK signals.

18. The adaptive receiver of claim 14 wherein the complex mixer has as a first input a down converted frequency of a high order modulated communication signal, and a second input is the reference oscillator signal.

19. The adaptive receiver of claim 14 wherein the adaptive Kalman filter is an adaptive exponentially weighted Kalman filter.

20. The adaptive receiver of claim 14 wherein the adaptive fade envelope estimator includes a Type II filter comprising an adder, an accumulator with transfer function $[z/(z-1)]$ and a filter with transfer function $F(z)$.

21. The adaptive receiver of claim 14 wherein the phase noise process is modeled by a state space model.

22. The adaptive receiver of claim 21 wherein the state space model is a second order model.

* * * * *